(12) United States Patent
Adams et al.

(10) Patent No.: US 7,196,862 B1
(45) Date of Patent: Mar. 27, 2007

(54) COHERENT PHASE DATA SEGMENT LAYOUT IN DATA STORAGE DEVICE

(75) Inventors: Donald Adams, Pleasanton, CA (US); Tain-Shain Lee, San Jose, CA (US); Ahmed Al-Mehdi, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 188 days.

(21) Appl. No.: 09/659,481

(22) Filed: Sep. 11, 2000

(51) Int. Cl.
*G11B 5/09* (2006.01)

(52) U.S. Cl. ........................................ 360/51

(58) Field of Classification Search ............... 360/48, 360/77.06, 51, 75, 77.01, 77.02, 78.08, 78.12
See application file for complete search history.

(56) References Cited

U.S. PATENT DOCUMENTS

| | | | |
|---|---|---|---|
| 4,864,435 A * | 9/1989 | Kawakami et al. ........... 360/66 |
| 5,005,089 A | 4/1991 | Thanos et al. |
| 5,077,736 A * | 12/1991 | Dunphy et al. ................ 714/7 |
| 5,412,809 A * | 5/1995 | Tam et al. .................... 360/75 |
| 5,483,393 A * | 1/1996 | Mento et al. ............ 360/77.08 |
| 5,510,905 A | 4/1996 | Birk |
| 5,576,906 A * | 11/1996 | Fisher et al. ............. 360/77.08 |
| 5,587,850 A | 12/1996 | Ton-That |
| 5,724,539 A | 3/1998 | Riggle et al. |
| 5,796,543 A * | 8/1998 | Ton-That ................. 360/77.08 |
| 5,822,142 A | 10/1998 | Hicken |
| 5,852,705 A | 12/1998 | Hanko et al. |
| 5,907,448 A * | 5/1999 | Watanabe et al. ........ 360/77.04 |
| 5,956,196 A * | 9/1999 | Hull et al. .................... 360/65 |
| 6,208,479 B1 * | 3/2001 | Suzuki ........................ 360/51 |
| 6,295,176 B1 * | 9/2001 | Reddy et al. ................. 360/51 |
| 6,384,998 B1 * | 5/2002 | Price et al. ................... 360/51 |
| 6,445,531 B1 * | 9/2002 | Gaertner et al. ......... 360/78.06 |

* cited by examiner

*Primary Examiner*—Wayne Young
*Assistant Examiner*—Glenda P. Rodriguez
(74) *Attorney, Agent, or Firm*—Tejpal S. Hansra

(57) ABSTRACT

A rotatable storage media includes a first data segment stored in first tracks and a second data segment stored in second tracks. The first tracks include a first start track and a first end track, and the second tracks include a second start track and a second end track. The first data segment starts in the first start track at a start rotational phase, ends in the first end track at an end rotational phase, starts in adjacent first tracks at start rotational phases offset by an intra-segment rotational skew angle and ends in adjacent first tracks at end rotational phases offset by the intra-segment rotational skew angles. The second data segment starts in the second start track at the start rotational phase, ends in the second end track at the end rotational phase, starts in adjacent second tracks at start rotational phases offset by the intra-segment rotational skew angle and ends in adjacent second tracks at end rotational phases offset by the intra-segment rotational skew angle. Furthermore, the first and second data segments are radially coherent, and the start and end rotational phases are offset by an inter-segment rotational skew angle that is greater than the intra-segment rotational skew angle.

72 Claims, 15 Drawing Sheets

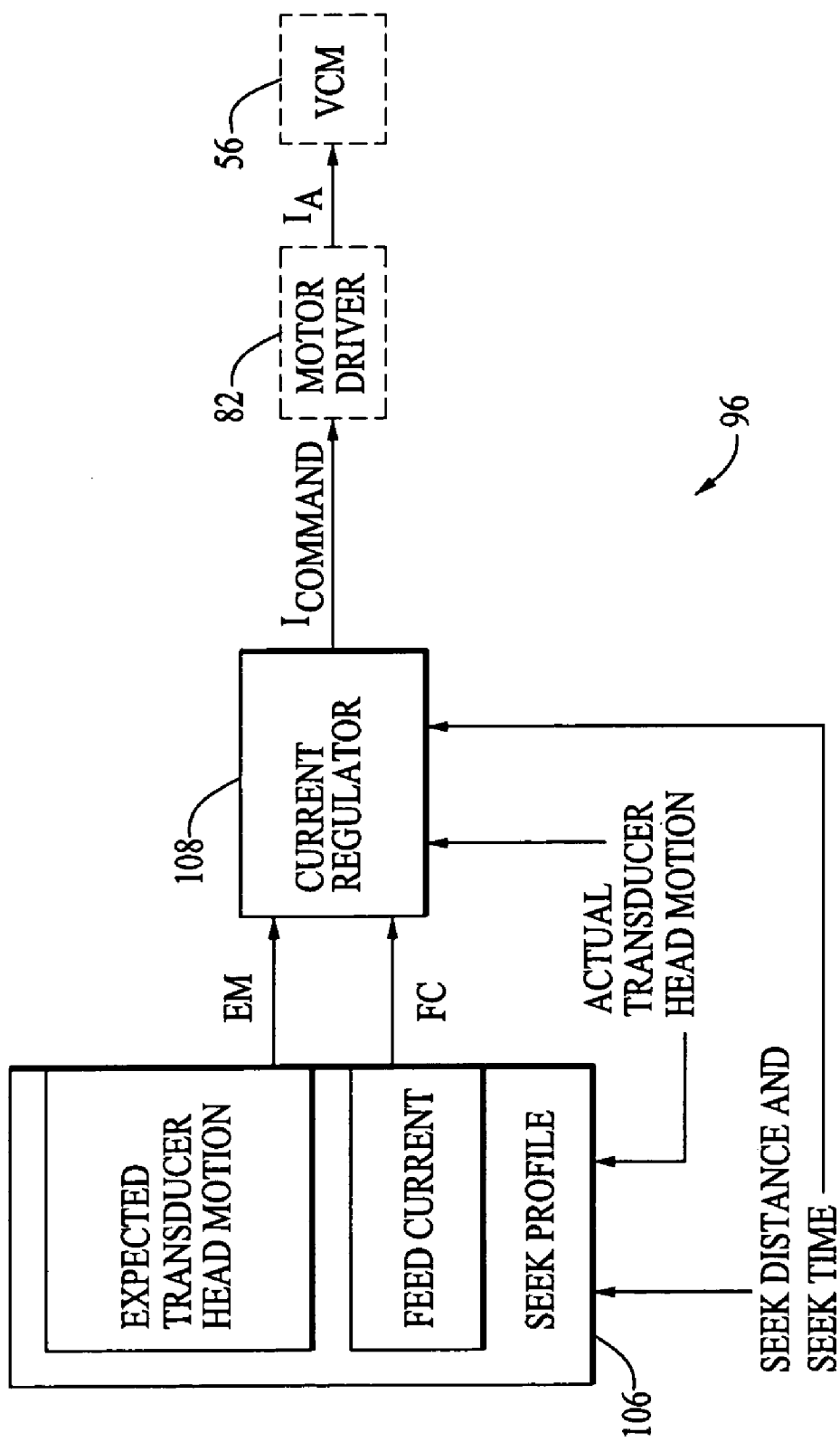

SUMMARY OF VARIOUS SOLUTIONS - 2 TRACKS PER DS
8.4 AVG SEEK TIME
11 TREV

| SKEW MODULUS | SKEW FACTOR | SKEW TIME | ROTATION PHASE | ROTATION TIME, MSEC | ROTATION ON AVG SEEK TIME | AVG RATE, MBPS |
|---|---|---|---|---|---|---|
| 17 | 6 | 3.88 | 0.647 | 7.12 | 0.85 | 7.82 |
| 17 | 5 | 3.24 | 0.706 | 7.76 | 0.92 | 8.03 |
| 18 | 5 | 3.08 | 0.722 | 7.94 | 0.95 | 8.07 |
| 21 | 5 | 2.62 | 0.762 | 8.38 | 1.00 | 8.19 |
| 17 | 4 | 2.59 | 0.765 | 8.41 | 1.00 | 8.2 |
| 22 | 5 | 2.50 | 0.773 | 8.50 | 1.01 | 8.23 |
| 18 | 4 | 2.44 | 0.778 | 8.56 | 1.02 | 8.25 |
| 23 | 5 | 2.39 | 0.783 | 8.61 | 1.02 | 8.26 |
| 19 | 4 | 2.32 | 0.789 | 8.68 | 1.03 | 8.29 |
| 20 | 4 | 2.20 | 0.800 | 8.80 | 1.05 | 8.32 |
| 21 | 4 | 2.10 | 0.810 | 8.90 | 1.06 | 8.35 |
| 32 | 6 | 2.06 | 0.813 | 8.94 | 1.06 | 8.36 |
| 64 | 12 | 2.06 | 0.813 | 8.94 | 1.06 | |
| 128 | 24 | 2.06 | 0.813 | 8.94 | 1.06 | |
| 256 | 48 | 2.06 | 0.813 | 8.94 | 1.06 | |
| 512 | 96 | 2.06 | 0.813 | 8.94 | 1.06 | |
| 1024 | 191 | 2.05 | 0.813 | 8.95 | 1.07 | |

FIG. 9A

COHERENT PHASE DATA SEGMENT LAYOUT IN DATA STORAGE DEVICE

FIELD OF THE INVENTION

The present invention relates to the organization of data in data storage devices, and more particularly, to the storage, retrieval and organization of radially coherent data segments in disk drives.

BACKGROUND OF THE INVENTION

Data storage devices such as disk drives provide data storage and retrieval in a variety of applications. A disk drive includes a spindle motor for rotating a disk, and a transducer head that moves radially across the disk to read from and write to concentric tracks on the disk. Many disk drives include multiple disks separated by spacer rings and stacked on a hub attached to the spindle motor, and multiple transducer heads that each read from and write to a different disk surface.

The tracks are each divided into circumferential divisions that are arced along the disk radius. The circumferential divisions each include a servo sector followed by a data sector. The servo sector contains servo information for positioning the transducer head over the track, and the data sector contains user data from an external device. The transducer head reads the servo sectors to position itself along the track as it reads and writes to and from the data sectors. In addition, the servo sectors are embedded in the tracks along servo wedges that extend radially across multiple tracks.

To access a data segment, the transducer head moves radially across the tracks to a destination track where the data segment starts during a seek operation. Thereafter, the disk rotates the start of the data segment on the track under the transducer head for reading or writing to or from the data segment during a track following operation. The data segment can continue onto one or more other tracks, in which case the transducer head sequentially moves to the subsequent tracks for accessing the remainder of the data segment.

The response time for accessing the data segment includes time periods for (1) moving the transducer head to the destination track (seek time), (2) rotating the start of the data segment under the transducer head (rotational latency time), and (3) recording or retrieving the data segment to or from the disk (transfer time). The access time is the seek time combined with the rotational latency time. Furthermore, the response time is inversely proportional to the data transfer rate (throughput). Thus, the access time is a significant performance feature since decreasing the access time decreases the response time which increases the data transfer rate of the disk drive.

FIG. 1 shows a conventional data segment layout in linear fashion. The data segments (DS) are each stored in two tracks (Tk) and contain a fixed number (x) of logical block addresses (LBA) per track. For instance, data segment DS0 is stored in tracks Tk0 and Tk1 and contains LBA0 to LBA2x, data segment DS1 is stored in tracks Tk2 and Tk3 and contains LBA2x+1 to LBA4x, and so on. The data segments have the same size, have the same number of LBAs, are arranged as sequential LBAs, occupy the same number of adjacent tracks, contain physically contiguous user data and fill the data sectors in the tracks they occupy.

The skew (phase advance or rotational skew angle) between adjacent (sequential) tracks as the disk rotates is a rational combination of the number of LBAs per track. The skew has a rotational latency time that is just greater than the seek time between adjacent tracks, and just greater than the head switch time between different transducer heads.

However, the data segments are not radially coherent. For instance, data segment DS1 has start and end rotational phases that are shifted relative to data segment DS0 by twice the skew, data segment DS2 has start and end rotational phases that are shifted relative to data segment DS1 by twice the skew and shifted relative to data segment DS0 by four times the skew, and so on.

Moreover, the intra-segment skew within a data segment is identical to the inter-segment skew between adjacent data segments. For instance, the intra-segment skew of data segment DS0 between tracks Tk0 and Tk1 is identical to the inter-segment skew of data segments DS0 and DS1 between tracks Tk1 and Tk2, the intra-segment skew of data segment DS1 between tracks Tk2 and Tk3 is identical to the inter-segment skew of data segments DS1 and DS2 between tracks Tk3 and Tk4, and so on.

Thus, the intra-segment skew between the start rotational phases of a data segment at adjacent tracks, and between the end rotational phases of a data segment at adjacent tracks, is the same as the inter-segment skew between the end rotational phase of a data segment and the start rotational phase of another data segment in adjacent tracks. Likewise, the inter-segment skew between the data segments varies as a function of the radial distance between the data segments.

The conventional data segment layout provides random access times for randomly selected data segments, which maximizes the forward sequential data transfer rate. As a result, the conventional data segment layout usually provides good data transfer rates when the disk drive supports computer applications. However, the conventional data segment layout provides poor data transfer rates when the disk drive supports consumer electronics applications with audio-video (AV) data (such as movies). For instance, the access time when moving sequentially backward through the AV data (as for reverse play or reverse search) is significantly higher than when moving forward through the AV data since the skew between the data segments is random and incoherent.

Disk drives typically perform the seek operation as fast as possible and then wait on average one-half a disk revolution for the start of the data segment to rotate under the transducer head ("hurry up and wait"). Unfortunately, the seek time and the rotational latency time are treated separately and combined by default although the access time is more important than the individual times. Furthermore, fast movements of the transducer head to reduce the seek time result in unwanted acoustic noise and high power consumption.

Disk drives have attempted to reduce the access time by altering the file system. However, the file system has incomplete knowledge of the data segment layout, and such knowledge can quickly become obsolete. As a result, the file system is over designed and creates cost penalties.

Disk drives have also attempted to reduce the access time by reordering the seek requests. Although seek request reordering can be effective when the disk drive supports computer applications, it is ineffective when the disk drive supports consumer electronics applications with multiple data streams of isochronous AV data since changing the order of requests results in failure to record or retrieve the correct AV data at the correct time.

There is, therefore, a need for improving access times and reducing acoustic noise in disk drives that store AV data.

SUMMARY OF THE INVENTION

The present invention provides a data segment layout in a rotatable storage media and related storage and retrieval that satisfy this need.

The storage media includes a first data segment stored in first tracks and a second data segment stored in second tracks. The first tracks include a first start track and a first end track, and the second tracks include a second start track and a second end track. The first data segment starts in the first start track at a start rotational phase, ends in the first end track at an end rotational phase, starts in adjacent first tracks at start rotational phases offset by an intra-segment rotational skew angle and ends in adjacent first tracks at end rotational phases offset by the intra-segment rotational skew angles. The second data segment starts in the second start track at the start rotational phase, ends in the second end track at the end rotational phase, starts in adjacent second tracks at start rotational phases offset by the intra-segment rotational skew angle and ends in adjacent second tracks at end rotational phases offset by the intra-segment rotational skew angle. Furthermore, the first and second data segments are radially coherent, and the start and end rotational phases are offset by an inter-segment rotational skew angle that is greater than the intra-segment rotational skew angle.

In an embodiment, the first tracks are adjacent to one another, the second tracks are adjacent to one another, the first end track is adjacent to the second start track, the first and second tracks have the same number of tracks, and the first and second data segments have the same size.

In another embodiment, the first data segment is physically contiguous user data that fills the user data storage areas in the first tracks, and the second data segment is physically contiguous user data that fills the user data storage areas in the second tracks.

In another embodiment, the first and second data segments are isochronous AV data. For instance, the first and second data segments are isochronous AV data from a single data stream, or alternatively, the first data segment is isochronous AV data from a first data stream and the second data segment is isochronous AV data from a second data stream.

In another embodiment, the inter-segment rotational skew angle is 360−α(N−1) degrees where α is the intra-segment rotational skew angle, N is the number of first tracks and N is the number of second tracks.

In another embodiment, a rotational latency time for rotating the storage media across the intra-segment rotational skew angle is a first seek time for moving the transducer head between first adjacent tracks and between second adjacent tracks, and a rotational latency time for rotating the storage media across the inter-segment rotational skew angle is a second seek time for moving the transducer head between the first end track and the second start track that is greater than the first seek time.

In another embodiment, the storage device provides the same forward and reverse sequential access times for the first and second data segments.

In another embodiment, a method for performing a seek operation includes receiving a seek request to move a transducer head from a start track to a destination track, determining a radial distance between the start and destination tracks, selecting a seek time as a function of the radial distance and whether the start and destination tracks are in a data segment or different data segments, selecting a command current as a function of the radial distance and the seek time, and moving the transducer head from the start track to the destination track during the seek time in response to the command current.

In another embodiment, the seek time is selected from a first seek time for intra-segment seeks, a second seek time for inter-segment short seeks and a third seek time for inter-segment long seeks, and the command current is selected to reduce acoustic noise.

In another embodiment, the first seek time is a rotational latency time for the intra-segment rotational skew angle, the second seek time is a rotational latency time for the inter-segment rotational skew angle, and the third seek time covers a full stroke.

In another embodiment, the data storage device is a disk drive and the storage media is a disk.

Advantageously, the present invention provides a data segment layout that organizes and allocates storage capacity in a data storage device. The present invention improves response time and provides a substantially constant sustained data transfer rate to and from the storage media due to the deterministic rotational latency time between the data segments. The present invention also reduces acoustic noise and is particularly useful for storing and retrieving AV data from multiple data streams.

BRIEF DESCRIPTION OF THE DRAWINGS

These and other features, aspects and advantages of the present invention will become better understood with regard to the following description, appended claims and accompanying drawings where:

FIG. 7 shows a functional diagram of a servo controller in the drive electronics;

FIG. 9A shows performance values for the disk drive;

To facilitate understanding, identical reference numerals have been used, where possible, to designate identical elements that are common throughout the figures.

DETAILED DESCRIPTION OF THE INVENTION

Figure 1:
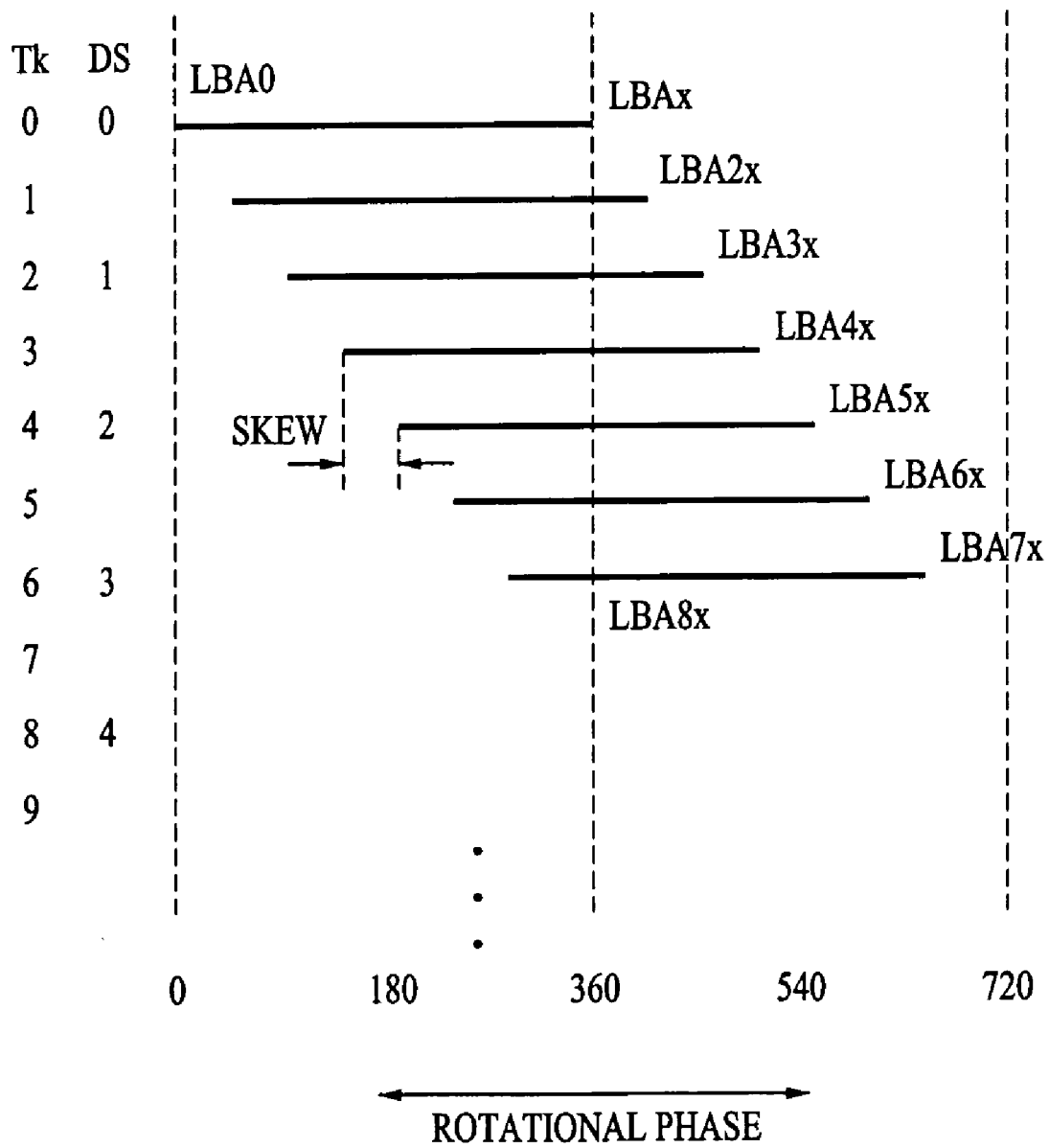
FIG. 1 shows a conventional data segment layout in linear fashion.
Figure 2:
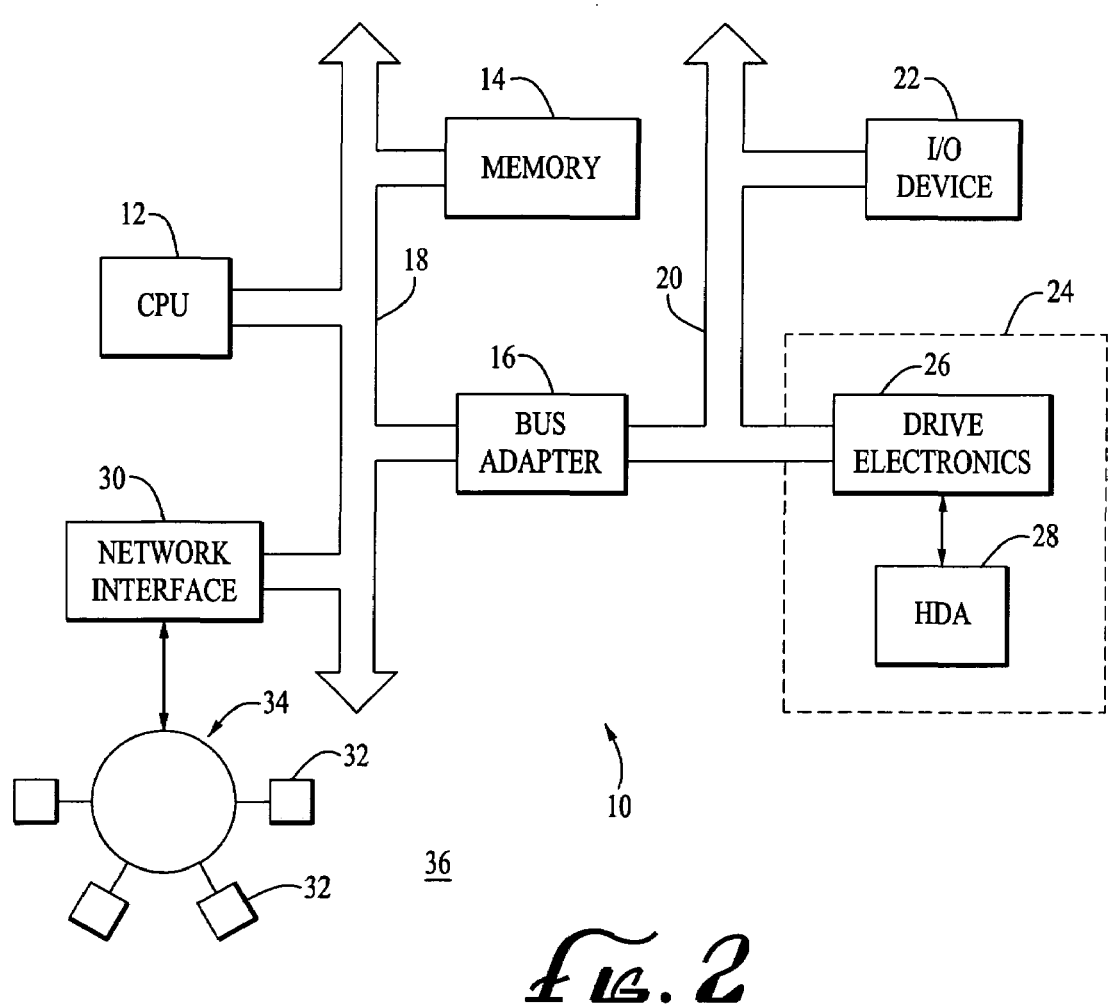
FIG. 2 shows a computer system that includes a disk drive.

FIG. 2 shows a computer system 10 that includes a central processing unit (CPU) 12, a main memory 14, and a bus adapter 16 interconnected by a system bus 18. The computer system 10 also includes an I/O bus 20 (SCSI, ATA, 1394, etc.) and various peripheral devices such as an I/O device 22 and a disk drive 24. The disk drive 24 includes drive electronics 26 and a head-disk assembly (HDA) 28. The computer system 10 also includes a network interface 30 connected to the system bus 18 for communication with other computer systems 32 via a network link 34 in a networked data processing system 36.

Figure 3:
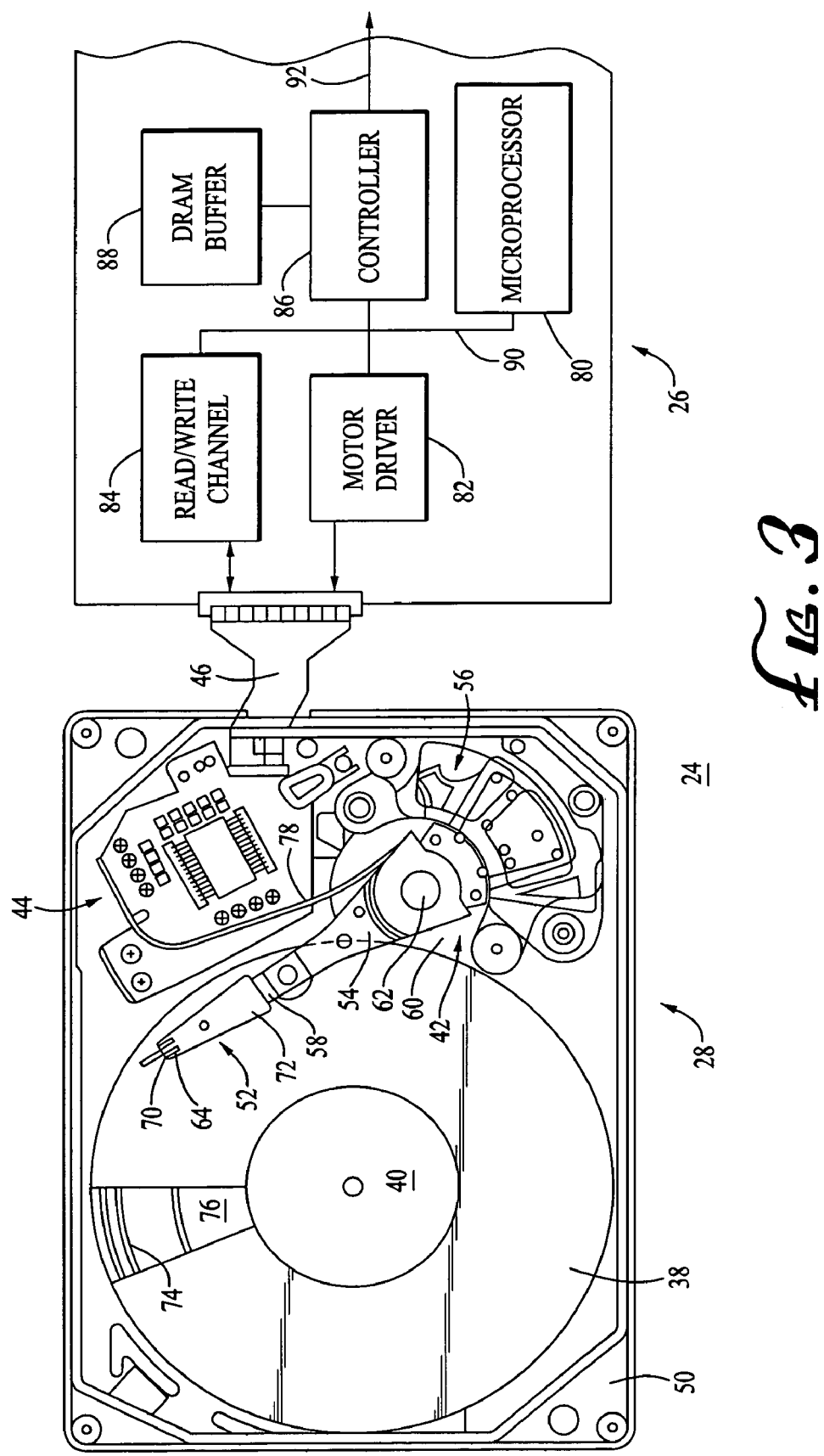
FIG. 3 shows a top plan view of a head-disk assembly (HDA) and a block diagram of disk electronics in the disk drive.

FIG. 3 shows a top plan view of the HDA 28 and a block diagram of the drive electronics 26. The HDA 28 includes a rotatable magnetic storage disk 38, a DC brushless in-hub spindle motor (not shown) that rotates the disk 38, a hub 40 containing and/or enclosing the spindle motor and spindle bearings, an actuator assembly 42, a preamplifier 44 that includes a read signal amplifier, a write signal driver and a transducer head selector, a flex circuit 46 that connects the drive electronics 26 to the HDA 28, and a base housing 50 to which the various components of the disk drive 24 are mounted and aligned.

The disk 38 is coated with a magnetic material that stores data in longitudinal bipolar magnetic patterns written by digital saturation recording. For simplicity, the following discussion mentions only a single disk 38 in the disk drive 24. However, the present invention is applicable to disk drives having multiple disks 38 mounted upon the hub 40, with the number of disks 38 and associated transducer heads affecting the vertical height of the disk drive.

The actuator assembly 42 includes a gimbal 52, a carriage 54 and a rotary voice coil motor (VCM) 56. The gimbal 52 is attached to an outer end 58 of the carriage 54, and the VCM 56 is attached to a hub end 60 of the carriage 54. A pivot 62 is centrally located along the carriage 54, and the actuator assembly 42 rotates about the pivot 62 on a dual bearing assembly secured to the base housing 50. The pivot 62 is adjacent to the disk 38 and the carriage 54 extends the gimbal 52 over the disk 38. Consequently, selective activation of the VCM 56 rotates the actuator assembly 42 about the pivot 62 to accurately position a transducer head 64 supported by the gimbal 52 over the disk 38.

The transducer head 64 includes a thin film inductive write element and a shielded thin film magnetoresistive (MR) read element. The transducer head 64 is formed at an outer end of one rail of a two rail aerodynamic slider 70 secured to the gimbal 52. The MR read element is formed on the slider 70 to take advantage of the smoothness of the finished slider end surface, and then the inductive write element is formed over the MR read element.

A load beam 72 supports the gimbal 52, the transducer head 64 and the slider 70 at one end and is coupled to the carriage 54 at the opposite end. The load beam 72 provides a preloading gram force to the slider 70 to bias it towards the disk 38. When the disk 38 is rotating, the slider 70 overcomes the spring bias of the load beam 72 and flies several microinches above the disk 38 on an air bearing and the transducer head 64 reads from and writes to tracks 74 in the disk 38 in accordance with Winchester technology. When the disk 38 is not rotating, the slider 70 rests upon a radially inward landing zone 76 of the disk 38.

The preamplifier 44 is connected by a flex circuit 78 to the actuator assembly 42 so that electrical signals reach the transducer head 64 via minute wires carried along the side of the carriage 54 and the load beam 72.

In the drive electronics 26, a microprocessor 80 implements a servo loop for positioning the actuator assembly 42 during seek and track following operations, a motor driver 82 provides drive signals to the spindle motor and the VCM 56, and a read/write channel 84 decodes coded data from the disk 38 using partial response, maximum likelihood (PRML) detection and also encodes and delivers coded data to the write driver of the preamplifier 44. A controller 86 implements a SERDES/ENDEC function, an ECC function, a data sequencer, a memory controller, a bus level interface and a microprocessor interface for interfacing the microprocessor 80 with other circuits. A DRAM buffer 88 includes microprocessor program instructions, seek profiles and data segments transferred between the CPU 12 and the disk 38. For example, the DRAM buffer 88 includes program instructions for execution by the microprocessor 80 to implement the servo loop. An internal data, address and control bus 90 connects the microprocessor 80, the motor driver 82, the read/write channel 84, the controller 86 and the DRAM buffer 88, and a drive interface bus 92 connects the controller 86 to the I/O bus 20.

During a seek operation, the servo loop receives position samples from the transducer head 64 based on position information within the servo sectors that are read by the transducer head 64, estimates the position and velocity of the transducer head 64 and the bias force of the actuator assembly 42 and specifies a command current using a seek profile that causes the motor driver 82 to drive the VCM 56 to move the transducer head 64 from the start track 74 to the destination track 74. During a track following operation, the servo loop specifies the command current based on position samples provided by the transducer head 64 in response to reading the servo sectors on the destination track 74, and the command current causes the motor driver 82 to drive the VCM 56 to maintain the transducer head 64 over the destination track 74.

Figure 4:
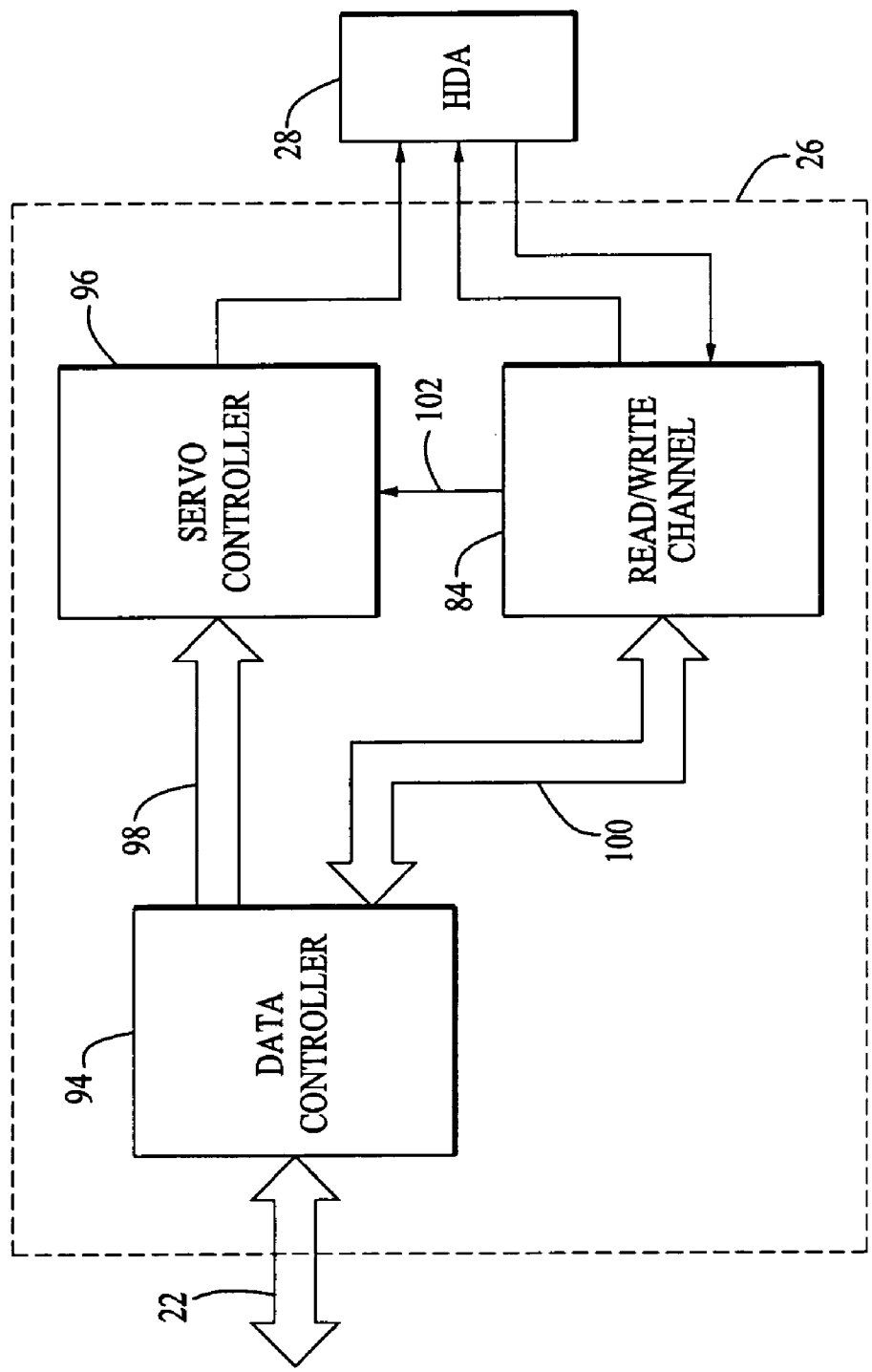
FIG. 4 shows an architecture of the drive electronics.

FIG. 4 shows an architecture of the drive electronics 26. The servo and data control functions of the microprocessor 80, the motor driver 82, the controller 86 and the DRAM buffer 88 are depicted or organized as a data controller 94 and a servo controller 96, respectively. The data controller 94 is connected to the I/O bus 20, and the read/write channel 84 and the servo controller 96 are connected to the HDA 28. In addition, the data controller 94 is connected to the servo controller 96 by a bus 98 and to the read/write channel 84 by a bus 100, and the read/write channel 84 is connected to the servo controller 96 by a bus 102.

During a write operation, the CPU 12 sends a write request to the disk drive 24, the CPU 12 transfers user data from the memory 14 onto the system bus 18, the bus adapter 16 transfers the data from the system bus 18 to the I/O bus 20, and the data controller 94 partitions the incoming data from the I/O bus 20 into data segments (blocks) with appropriate header information and appends error detection and correction bits. The read/write channel 84 encodes the data segments and converts the data segments from digital to analog form suitable for the transducer head 64 to write to the disk 38. Concurrently, the servo controller 96 causes the actuator assembly 42 to move the transducer head 64 to the appropriate tracks 74 during seek operations, and the transducer head 64 writes the data segments to the tracks 74 during track following operations.

During a read operation, the CPU 12 sends a read request to the disk drive 24, the data controller 94 provides the servo controller 96 with the tracks 74 in which the data segments are stored, the servo controller 96 causes the actuator assembly 42 to move the transducer head 64 to the appropriate tracks 74 during seek operations, and the transducer head 64 reads the data segments from the tracks 74 during track following operations. The read/write channel 84 converts the data segments from analog to digital form and decodes the data segments, the data controller 94 removes the header information and the appended bits and sends the data segments to the I/O bus 20, the bus adapter 16 transfers the data from the I/O bus 20 to the system bus 18 and the CPU 12 stores the data in the memory 14.

Figure 5:
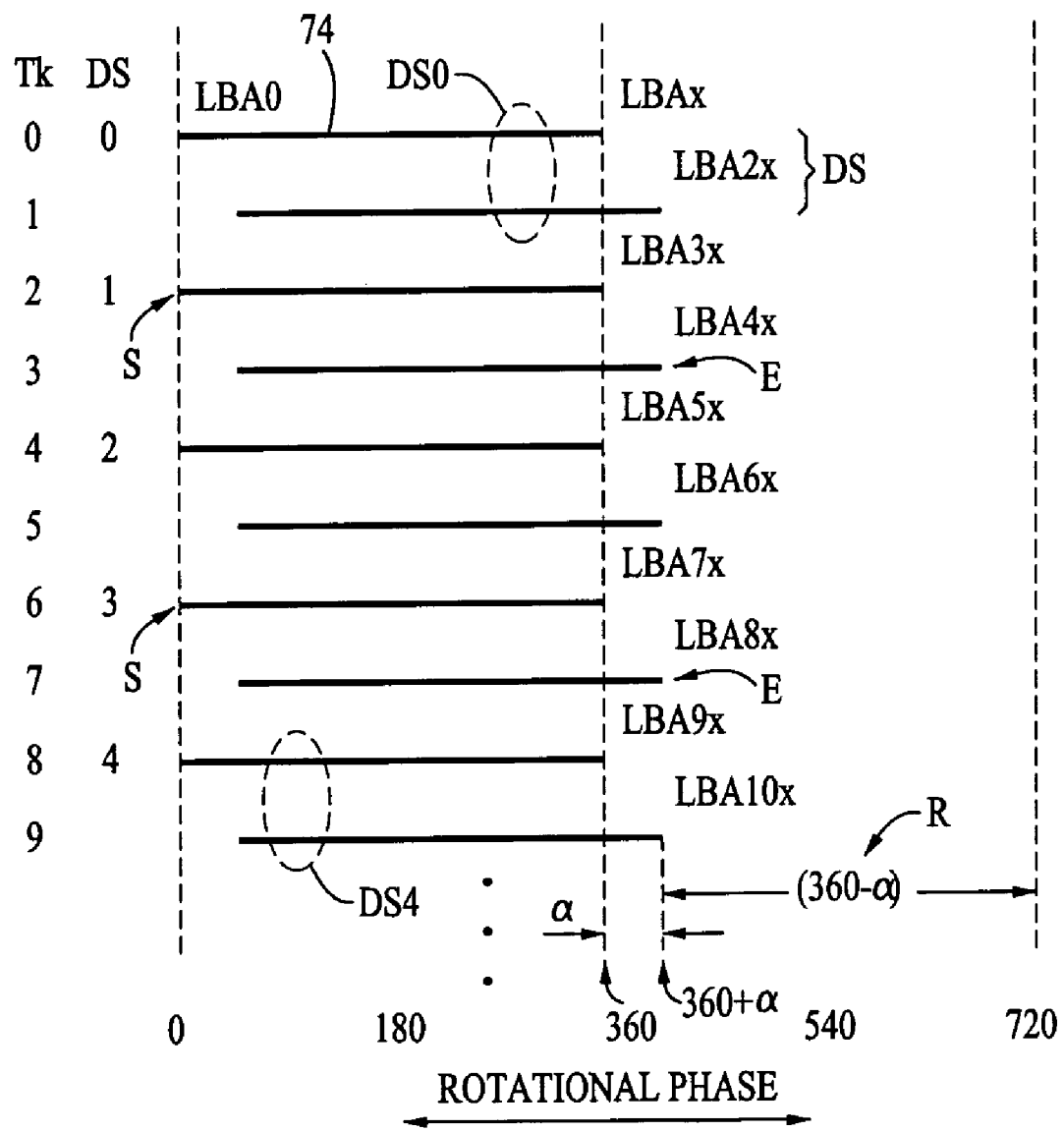
FIG. 5 shows a data segment layout in linear fashion.

FIG. 5 shows a data segment layout in linear fashion according to the present invention. The data segments (DS) are each stored in two tracks (Tk) 74 and contain a fixed number (x) of LBAs per track 74. For instance, data segment DS0 is stored in tracks Tk0 and Tk1 and contains LBA0 to LBA2$x$, data segment DS1 is stored in tracks Tk2 and Tk3 and contains LBA2$x$+1 to LBA4$x$, and so on. The data segments have the same size, have the same number of LBAs, are arranged as sequential LBAs, occupy the same number of adjacent tracks 74, contain physically contiguous user data and fill the data sectors in the tracks 74 they occupy, as is conventional.

Moreover, the data segments are radially coherent. The data segments each start at a start rotational phase (S) in a start track 74 and end at an end rotational phase (E) in an end track 74. For instance, data segment DS0 starts at start rotational phase S in track Tk0 and ends at end rotational phase E in track Tk1, data segment DS1 starts at start rotational phase S in track Tk2 and ends at end rotational phase E in track Tk3, and so on.

The intra-segment skew ($\alpha$) within a data segment is less than the inter-segment skew (R) between the data segments. For instance, the intra-segment skew of data segment DS0 between tracks Tk0 and Tk1 is less than the inter-segment skew of data segments DS0 and DS1 between tracks Tk1 and Tk2, the intra-segment skew of data segment DS1 between tracks Tk2 and Tk3 is less than the inter-segment skew of data segments DS1 and DS2 between tracks Tk3 and Tk4, and so on.

The data segments each have a start rotational phase at 0 degrees and an end rotational phase at 360+$\alpha$(N−1) degrees where N is the number of tracks 74 within the data segment. For instance, data segment DS0 starts at 0 degrees in track Tk0 and ends at 360+$\alpha$ degrees in track Tk1, data segment DS1 starts at 0 degrees in track Tk2 and ends at 360+$\alpha$ degrees in track TK3, and so on.

The inter-segment skew between the end rotational phase of a data segment and the start rotational phase of any subsequent data segment, adjacent or otherwise, is 360−$\alpha$(N−1) degrees. For instance, the inter-segment skew between the end rotational phase of data segment DS0 in track Tk1 and the start rotational phase of data segment DS1 in track Tk2 is 360−$\alpha$ degrees, the inter-segment skew between the end rotational phase of data segment DS1 in track Tk3 and the start rotational phase of data segment DS2 in track Tk4 is 360−$\alpha$ degrees, and so on. As a result, the inter-segment rotational latency time from the end rotational phase of a data segment to the start rotational phase of any subsequent data segment is predetermined and is the same.

The intra-segment skew spans about 20 to 30 percent of 360 degrees (72 to 108 degrees). Furthermore, the intra-segment skew can be adjusted to refine average and worst case access times.

Thus, the intra-segment skew between the start rotational phases of a data segment at adjacent tracks 74, and between the end rotational phases of a data segment at adjacent tracks 74, is the same for all data segments. The inter-segment skew between the end rotational phase of a data segment and the start rotational phase of another data segment is the same for all data segments. In addition, the inter-segment skew is greater than the intra-segment skew and is 360−$\alpha$(N−1) degrees where $\alpha$ is the intra-segment skew and N is the number of tracks 74 that each data segment occupies.

Figure 6A:
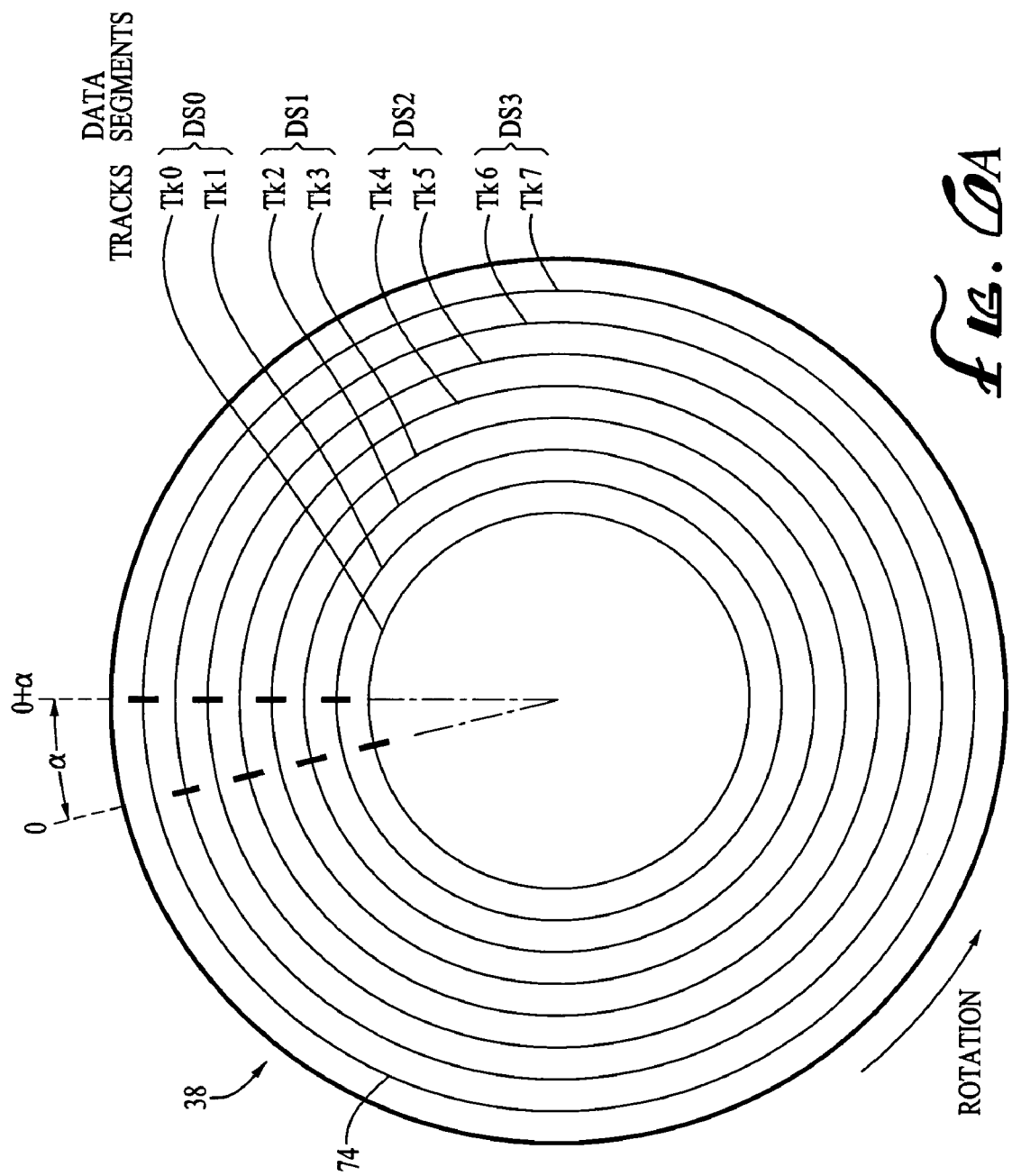
FIG. 6A shows a data segment layout in angular fashion.

FIG. 6A shows the data segment layout of FIG. 5 in angular fashion.

Figure 6B:
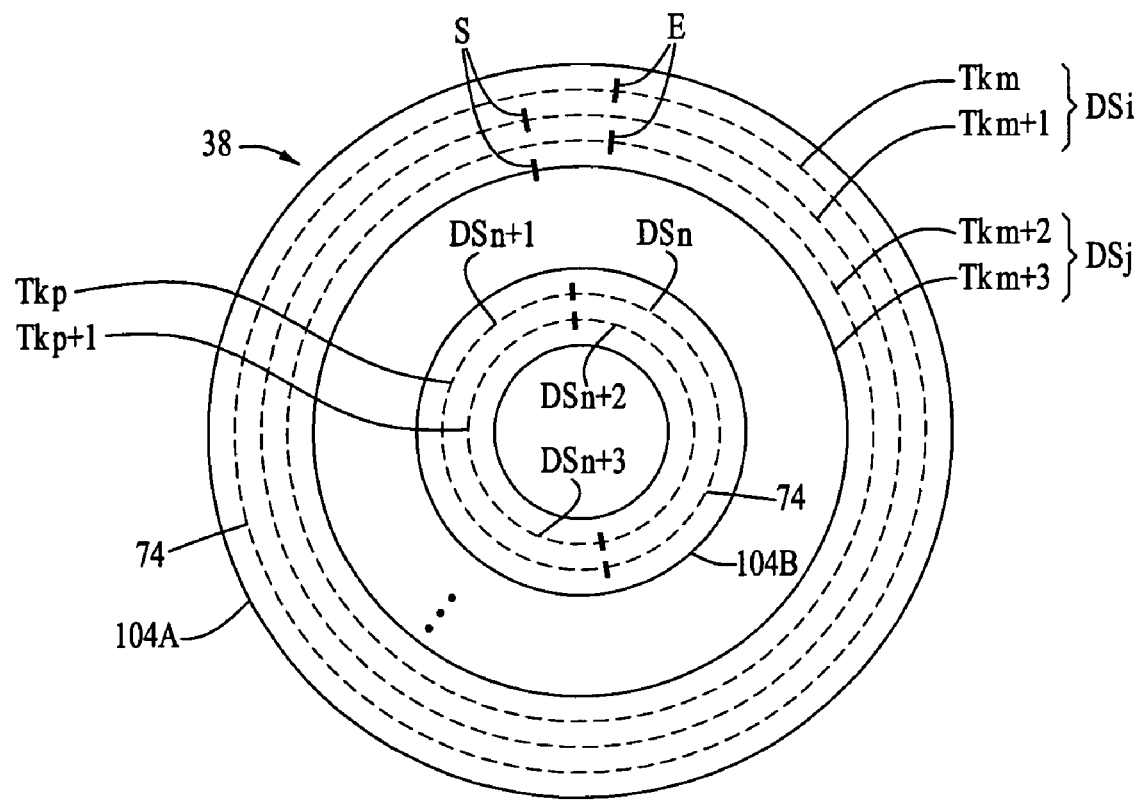
FIG. 6B shows data segment layouts in recording zones in angular fashion.

FIG. 6B shows data segment layouts in recording zones 104 in angular fashion. The disk 38 contains 16 concentric recording zones 104 that include an outer recording zone 104A and an inner recording zone 104B. A data segment layout is located in the outer recording zone 104A, and another data segment layout is located in the inner recording zone 104B.

The data segments have the same start and end rotational phases and the same size in each recording zone 104, but the data segments have different start and end rotational phases and different sizes in different recording zones 104. For instance, data segment DSi is stored in tracks Tkm and Tkm+1 and data segment DSj is stored in tracks Tkm+2 and Tkm+3 in the outer recording zone 104A, however data segments DSn and DSn+1 are stored in track Tkp and data segments DSn+2 and DSn+3 are stored in track Tkp+1 in the inner recording zone 104B. Thus, the outer recording zone 104A contains a data segment per two tracks 74, and the inner recording zone 104B contains two data segments per track 74.

The disk drive 24 uses variable frequency recording in which the sectors per track 74 varies by the recording zones 104. There are about twice as many sectors per track 74 in the outer recording zone 104A than in the inner recording zone 104B. In addition, the data segments span more circumferential distance in the outer recording zone 104A than in the inner recording zone 104B. In this manner, the data segment sizes vary linearly by the recording zones 104.

The servo controller 96 implements a servo loop using seek profiles that specify the command current in response to a seek request. The seek profiles specify the command current as a function of the radial distance between the starting and destination tracks 74, the rotational latency time between the starting and destination tracks 74 and the relationship between the starting and destination tracks 74.

The seek profiles specify a first seek time for seeks between adjacent tracks in a data segment, a second seek time for seeks between data segments that are within a predetermined radial distance from one another, and a third seek time for seeks between data segments that are farther than the predetermined radial distance from one another. Furthermore, the first seek time is the rotational latency time for the intra-segment skew, the second seek time is the rotational latency time for the inter-segment skew, and the third seek time is substantially greater than the rotational latency time for the inter-segment skew. Thus, the first seek time is for intra-segment track-to-track seeks, the second seek time is for inter-segment short seeks, and the third seek time is for inter-segment long seeks. The first seek time is sufficient for seeks between adjacent tracks, the second seek time is sufficient for seeks between tracks spaced by less than the predetermined radial distance, and the third seek time is sufficient for seeks between the inner most tracks and outer most tracks (the full stroke) in the disk 38.

The seek profiles specify the command current to perform the seek operation during the specified seek time rather than as fast as possible. The command current for short seeks decreases and therefore the seek velocity, the acoustic noise and the power consumption decrease as the radial distance between the data segments decreases. Likewise, the command current for long seeks decreases and therefore the seek velocity, the acoustic noise and the power consumption decrease as the radial distance between the data segments decreases. In each instance, the seek operation is completed at the expiration of the seek time, and preferably not sooner. As a result, the seek time, the command current and the seek velocity are constant between adjacent tracks within a data segment, the seek time is constant and the command current and the seek velocity are a function of the radial distance between data segments spaced by less than the predetermined radial distance, and the seek time is constant and the command current and the seek velocity are a function of the radial distance between data segments spaced by more than the predetermined radial distance.

Table 1 lists the seek times and radial distances for the disk drive 24. The first seek time is 2 msec for intra-segment track-to-track seeks, the second seek time is 8 msec for inter-segment seeks between one and two thousand tracks, and the third seek time is 19 msec for inter-segment seeks between two thousand one tracks and the full stroke. For instance, the seek time for seeks within data segment DS0 from track Tk0 to track Tk1 is 2 msec, the seek time for seeks within data segment DS1 from track Tk2 to track Tk3 is 2 msec, and so on. Likewise, the seek time for seeks between data segments DS0 and DS1 from track Tk1 to track Tk2 is 8 msec, the seek time for seeks between data segments DS1 and DS2 from track Tk3 to track Tk4 is 8 msec, the seek time for seeks between data segments DS0 and DS2 from track Tk1 to track Tk4 is 8 msec, and so on. Furthermore, each recording zone 104 has two thousand tracks, and therefore the seek time between data segments within a recording zone 104 is 8 ms.

TABLE 1

| Seek Distance | Seek Time |
| --- | --- |
| One track and head switches (intra-segment seeks) | 2 msec |
| One track to two thousand tracks (inter-segment seeks) | 8 msec |
| Two thousand one tracks to full stroke (inter-segment seeks) | 19 msec |

Advantageously, the disk drive 24 provides a substantially constant data transfer rate. In addition, since the servo controller 96 takes the entire 8 msec for short seeks and the entire 19 msec for long seeks, aggressive time-optimal seek profiles are unnecessary, the seek performance is systematically relaxed and the command current is reduced, thereby reducing acoustic noise, power consumption and strain on the base housing 50, the VCM 56 and the motor driver 82. Moreover, the average and worst case access times are reduced, which is particularly beneficial when the disk drive 24 supports a large number of simultaneous data streams and the AV data has become fragmented on the disk 38.

FIG. 7 shows a functional diagram of the servo controller 96. The servo controller 96 includes seek profiles 106 and a current regulator 108, and the seek profiles 106 include feed currents and expected motion (position and velocity) of the transducer head 64.

During a seek operation, the actual motion (position and velocity) of the transducer head 64 is provided to the seek profiles 106 and the current regulator 108. In addition, the seek distance (the radial distance between the start and destination tracks 74) and the seek time (provided by Table 1) are provided to the seek profiles 106 and the current regulator 108.

The seek profiles 106 determine the feed current (FC) and the expected motion (EM) (position and velocity) of the transducer head 64 based on the seek distance and the seek time, and provide the feed current and the expected motion to the current regulator 108. The feed current is a current profile that specifies a command current to perform the seek operation across the seek distance during the seek time (and not sooner). Thus, the feed current is a prior prediction of the command current expected to carry out the seek operation. The feed currents are determined by initialization calibration routines of the disk drive 24 and stored in the DRAM buffer 88 in a look-up table indexed by the seek distance and the seek time, or alternatively, the feed currents are calculated by the microprocessor 80 based on the seek time and the seek distance. The expected motion includes velocity constraints on the transducer head 64.

The current regulator 108 generates the command current ($I_{COMMAND}$) based on the feed current, the actual and expected motion (of the transducer head 64) and the seek distance and seek time, and the motor driver 82 drives the VCM 56 with an actuator current ($I_A$) based on the command current. The current regulator 108 uses the feed current as the command current as the transducer head 64 begins to move from the start track 74 towards the destination track 74. Thereafter, the current regulator 108 compares the actual and expected motion (of the transducer head 64) in conjunction with the seek time and seek distance and adjusts the feed current to generate the command current in accordance with the seek profile as the transducer head 64 continues to move towards the destination track 74. Thus, the current regulator 108 specifies the command current as the feed current based on a reference trajectory and then specifies the command current as the adjusted feed current based on the actual motion of the transducer head 64 to correct for deviations from the reference trajectory due to friction, torque constant variation, etc.

Figure 8:
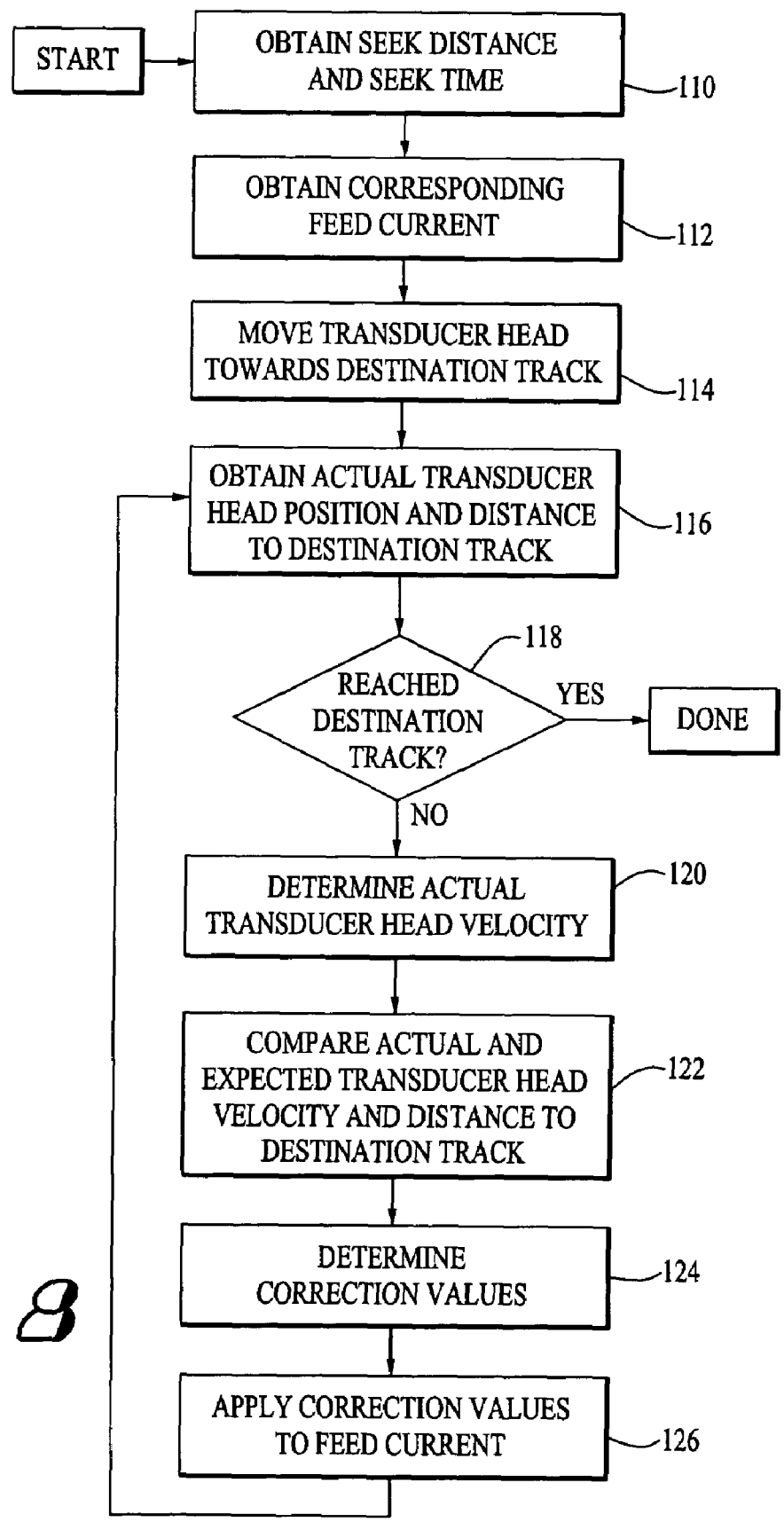
FIG. 8 shows a flow diagram for performing a seek operation.

FIG. 8 shows a flow diagram for performing a seek operation. The disk drive 24 implements the seek operation by having the microprocessor 80 in the servo controller 96 execute program instructions as the current regulator 108 and send the command current to the motor driver 82.

The microprocessor 80 obtains the seek distance between the start track 74 and the destination track 74 by calculating the radial distance between the start track 74 (where the transducer head 64 currently resides) and the destination track 74 (specified by the seek request), and obtains the seek time from Table 1 based on the seek distance and whether the start and destination tracks 74 are intra-segment or inter-segment (step 110). The microprocessor 80 obtains the feed current from the seek profile in response to the seek distance and the seek time (step 112) and uses the feed current as the command current to move the transducer head 64 from the start track 74 towards the destination track 74 (step 114).

The microprocessor 80 obtains the actual position (current track 74) of the transducer head 64 and subtracts the actual position (current track 74) from the destination track 74 to determine the radial distance (number of tracks 74) remaining to be crossed (step 116). At this initial stage, the transducer head 64 has yet to reach the destination track 74 (step 118).

The microprocessor 80 calculates the actual velocity of the transducer head 64 by the number of tracks 74 the transducer head 64 crosses between sampling intervals of the servo wedges (step 120). The microprocessor 80 detects the position of the transducer head 64 each sampling interval, and calculates the velocity of the transducer head 64 by determining the number of tracks 74 between the current sampling interval and the preceding sampling interval. The velocity is expressed as tracks per sample.

The microprocessor 80 then compares the actual and estimated velocity of the transducer head 64, and the actual and estimated radial distance between the transducer head 64 and the destination track 74 (step 122) to determine correction values (step 124) and applies the correction values to the feed current to adjust the command current so that the transducer head 64 more accurately follows the reference trajectory (step 126). The microprocessor 80 then repeats steps 116 to 126 until the destination track 74 is reached (step 118).

Figure 9B:
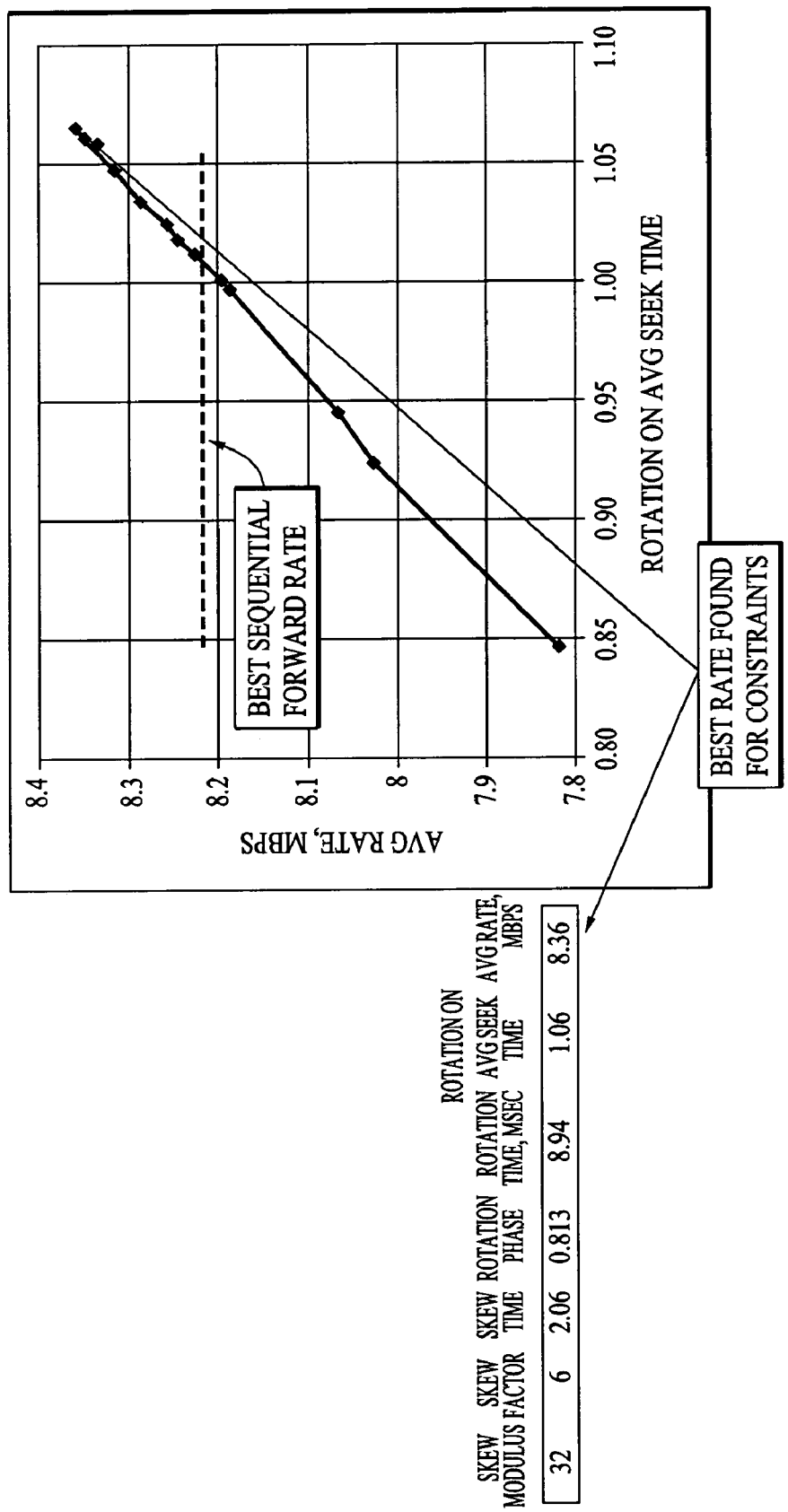
FIG. 9B shows a performance plot for the disk drive.

FIG. 9A shows performance values for the disk drive 24 using the data segment layout of the present invention, and FIG. 9B shows a performance plot for the disk drive 24 using the data segment layout of the present invention. In these examples, the skew time is optimized as follows:

skew modulus=integer number of sectors into which disk revolution is divided;
skew factor=integer number of sectors to set skew angle or time;
Trev=time per disk revolution;
A=(skew factor)/(skew modulus);
skew angle α=A×360 degrees;
skew time=A×Trev;
rotation phase=(1−A)×360 degrees;
rotation time=(1−A)×Trev—time for disk to rotate to start of next data segment;
rotation on average seek time=(rotation time)/(average seek time);
average rate=(data per data segment/(average seek time+ rotation time+data transfer time).

The skew modulus can be less than or equal to the number of servo samples per track 74 because the disk drive 24 cannot resolve time or phase below the servo sampling interval. Thus, A is a rational number between 0 and 1. The skew modulus and the skew factor are selected for a desired rotational time. The inter-segment rotational time to the next data segment is about the average seek time, and this establishes a guide for the data segment layout and the seek profiles.

Figure 10:
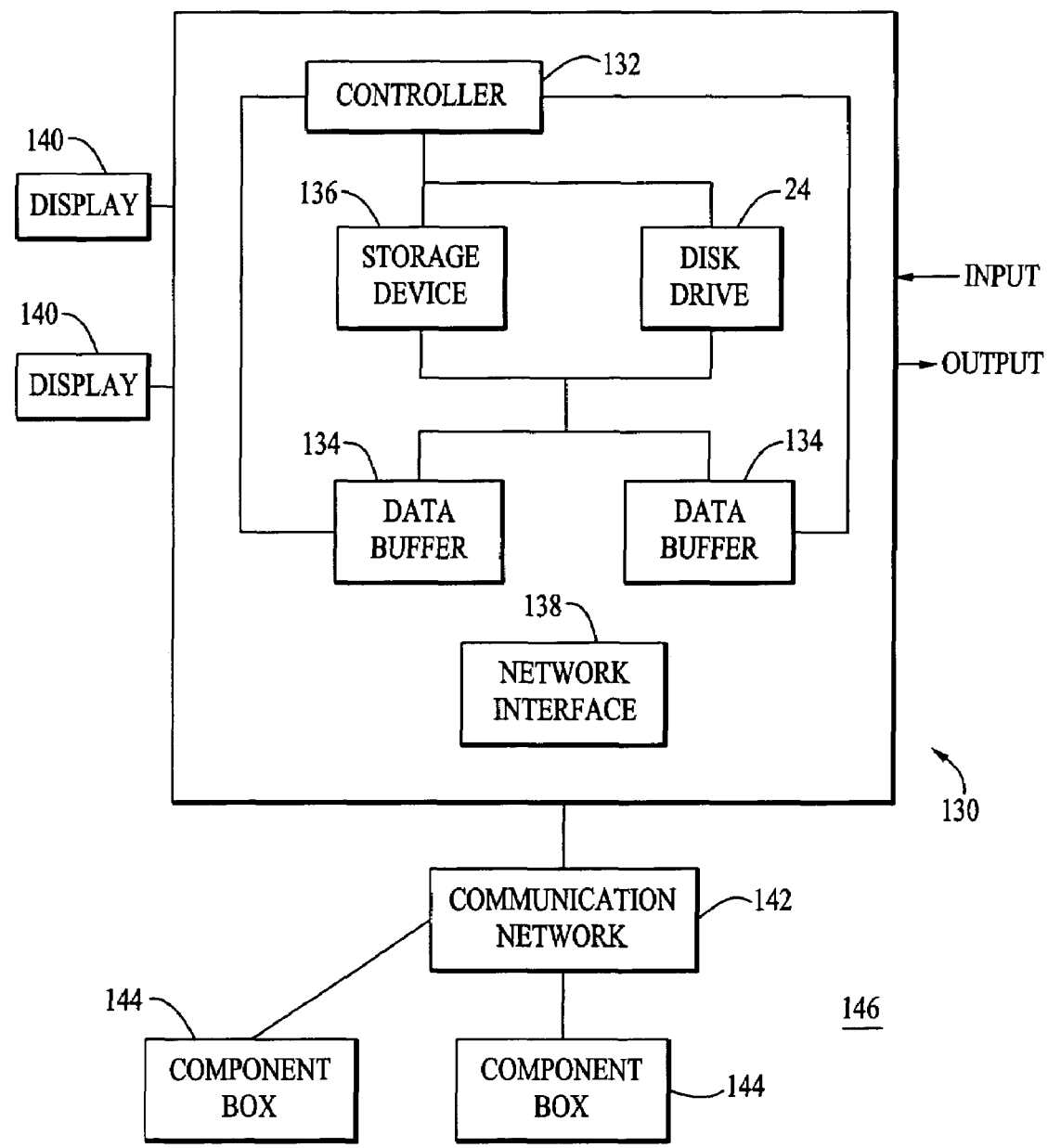
FIG. 10 shows an AV storage server that includes the disk drive.

FIG. 10 shows an AV storage server 130 that includes the disk drive 24, a controller 132, data buffers 134, a storage device 136 and a network interface 138. The AV storage server 130 is connected to displays 140, and is also connected by a communication network 142 to component boxes 144 such as consumer electronics equipment in a networked AV system 146.

The AV storage server 130 receives multiple data streams that contain isochronous AV data from an external device, for instance a cable or the component box 144. The data streams are sequences of discrete fragments of AV data which are periodically transmitted in bursts that each contain about 0.5 to 1.0 seconds of AV data, and the data transmission is constant over time. The controller 132 sends the multiple data streams to the disk drive 24 via the data buffer 134, which smoothes out the data streams, and the disk drive 24 partitions the data streams into corresponding data segments and stores the data segments on the disk 38. Thereafter, the controller 132 requests the multiple data streams from the disk drive 24, which reads the data segments from the disk 38 and sends the data streams to the controller 132, and the controller 132 sends the data streams to an external device, for instance the display 140 or the component box 144.

Advantageously, the disk drive 24 provides the same forward sequential and reverse sequential access times for reading the data segments since the data segments are radially coherent. This is particularly beneficial for trick-play features such as fast-forward and fast-reverse searching through the AV data.

Figure 11:
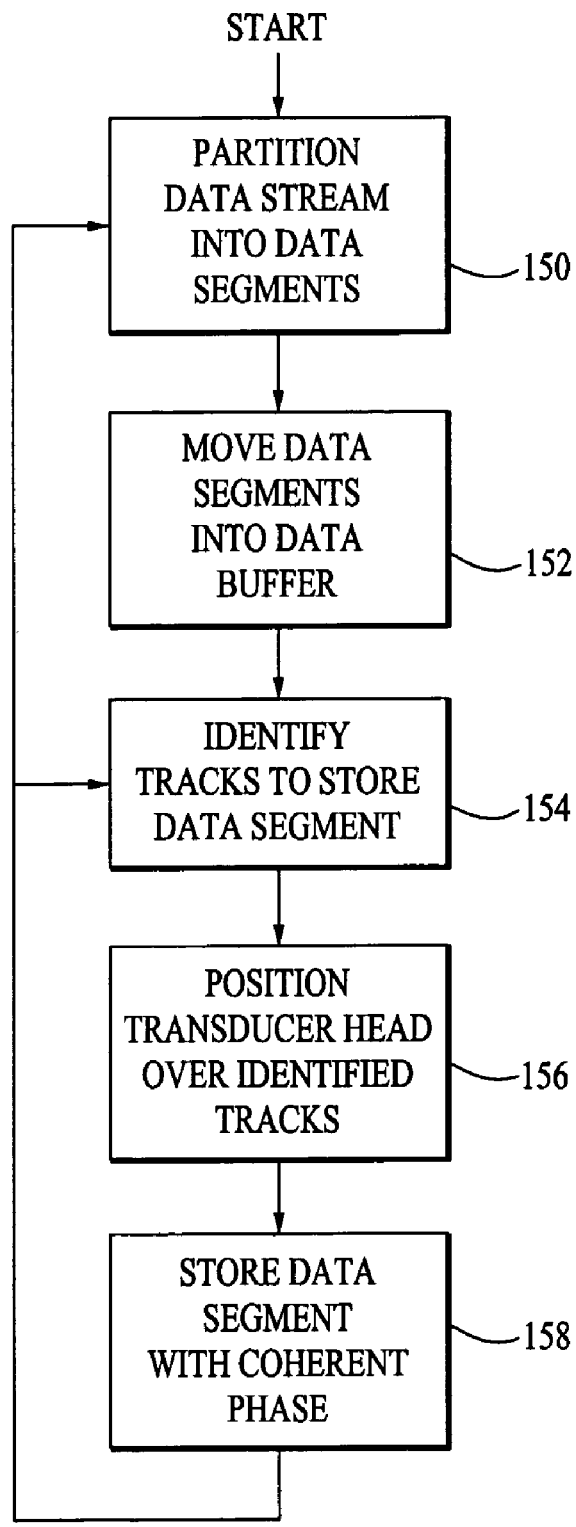
FIG. 11 shows a flow diagram for storing AV data in the disk drive.

FIG. 11 shows a flow diagram for storing AV data in the disk drive 24. The disk drive 24 implements the write operation by having the microprocessor 80 in the data controller 94 and the servo controller 96 execute program instructions.

The microprocessor 80 partitions the incoming data stream into the data segments (step 150), moves the data segments into the DRAM buffer 88 (step 152), identifies the tracks 74 to store the next data segment (step 154), directs the VCM 56 to position the transducer head 64 over the identified tracks 74 (step 156) and records the data segment in the identified tracks 74 with radially coherent phase relative to the other data segments stored on the disk 38 (step 158). The microprocessor 80 repeats steps 150 and 152 until the data stream is finished and repeats steps 154, 156 and 158 until the data segments are transferred from the DRAM buffer 88 to the disk 38.

The microprocessor 80 can execute steps 150 to 158, or alternatively, the CPU 12 can execute steps 150 and 152 and the microprocessor 80 can execute steps 154, 156 and 158. Furthermore, the AV data can be partitioned from a single data stream or multiple data streams into the data segments. Still further, steps 150 to 158 can be performed sequentially or simultaneously for multiple data streams. In every case, the disk drive 24 stores data segments that contain AV data in the data segment layout of the present invention, regardless of whether the CPU 12 or the microprocessor 80 partitions the AV data into the data segments, regardless of whether the AV data is partitioned from one or more data streams, and regardless of whether the AV data from multiple data streams is processed simultaneously.

Figure 12:
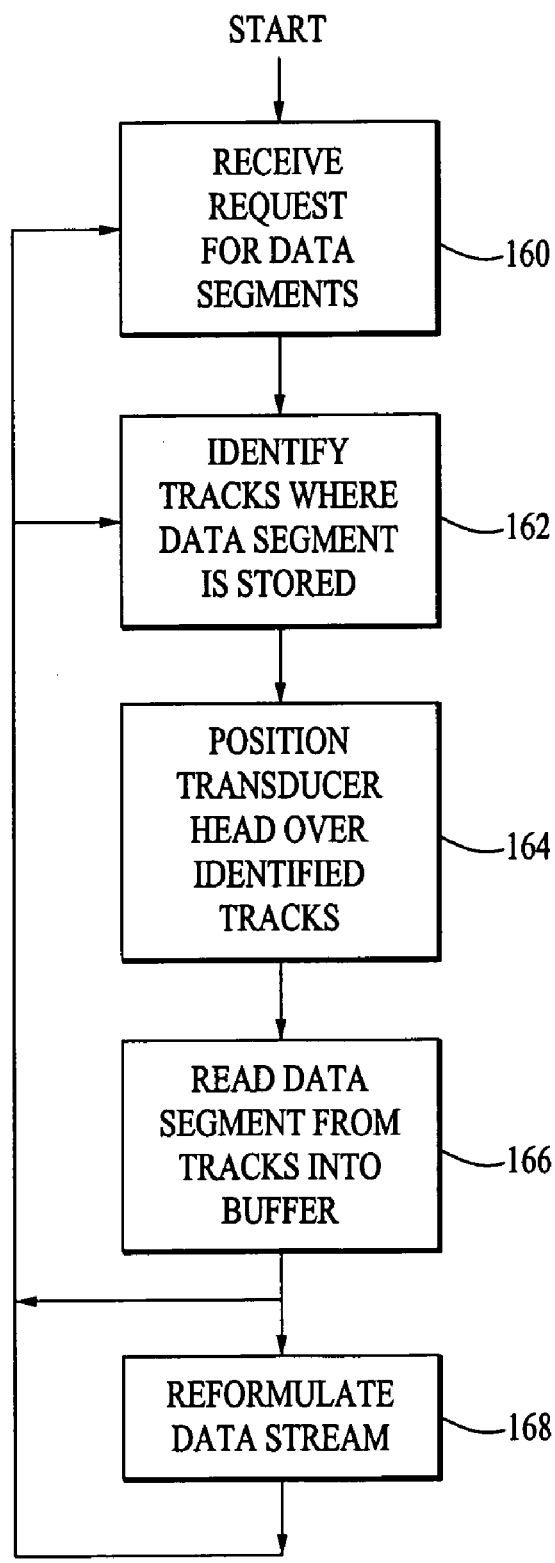
FIG. 12 shows a flow diagram for retrieving AV data from the disk drive.

FIG. 12 shows a flow diagram for retrieving AV data from the disk drive 24. The disk drive 24 implements the read operation by having the microprocessor 80 in the data controller 94 and the servo controller 96 execute program instructions.

The microprocessor 80 receives a request for the data segments (step 160), identifies the tracks 74 that store the next data segment (step 162), directs the VCM 56 to position the transducer head 64 over the identified tracks 74 (step 164), retrieves the data segment in the identified tracks 74 and moves the data segment into the DRAM buffer 88 (step 166). The microprocessor 80 repeats steps 162, 164 and 166 until the data segments are read from the disk 38 and then reformulates the data stream by combining the data segments (step 168).

The microprocessor 80 can execute steps 160 to 168, or alternatively, the microprocessor 80 can execute steps 160 to 166 and the CPU 12 can execute step 168. Furthermore, the AV data can be reformulated into a single data stream or multiple data streams. Still further, steps 160 to 168 can be performed sequentially or simultaneously for multiple data streams. In every case, the disk drive 24 reads data segments that contain AV data in the data segment layout of the present invention, regardless of whether the CPU 12 or the microprocessor 80 reformulate the data stream, regardless of whether one or more data streams are reformulated from the data segments, and regardless of whether the AV data for multiple data streams is processed simultaneously.

The disk drive 24 is initially formatted with the data segment layout using an S-scan during manufacturing. Thereafter, the microprocessor 80 maps the LBAs of the data segments into data sectors on the disk 38 using an LBA to physical location transformation module executed by firmware during write operations, and performs the inverse transformation during read operations.

Figure 13A:
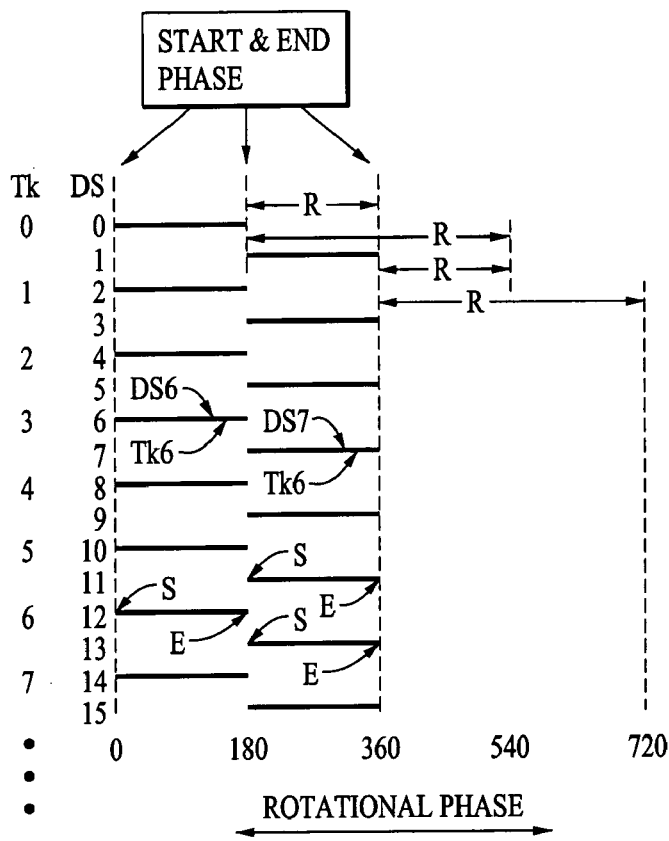
FIG. 13A shows a data segment layout in linear fashion in which each data segment is one-half the track size.

FIG. 13A shows a data segment layout in linear fashion in which each data segment is one-half the track size. The tracks 74 each contain two data segments which each extend 180 degrees, similar to the data segments in the inner recording zone 104B. For instance, data segments DS6 and DS7 are stored in track Tk6, and so on. The tracks 74 each contain 512 data sectors, and therefore the data segments each contain 256 data sectors, the standard limit of an ATA command. Furthermore, the data segments have two inter-segment skews relative to the other data segments, namely 180 degrees (one-half a revolution of the disk 38) and 360 degrees (a full revolution of the disk 38), and the intra-segment skew is inapplicable.

Figure 13B:
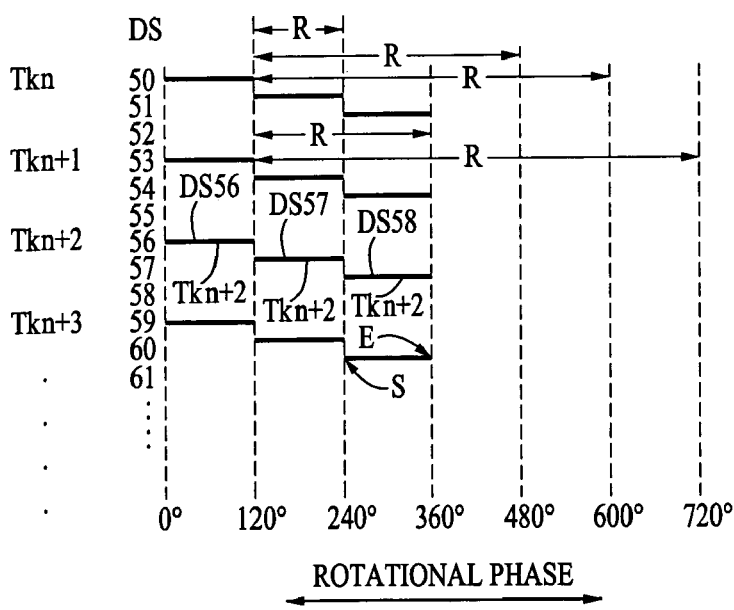
FIG. 13B shows a data segment layout in linear fashion in which each data segment is one-third the track size.

FIG. 13B shows a data segment layout in a linear fashion in which each data segment is one-third the track size. The tracks 74 each contain three data segments which each extend 120 degrees. For instance, data segments DS56, DS57 and DS58 are stored in track Tkn+2, and so on.

The data segment layouts in FIGS. 5, 13A and 13B can be stored in different recording zones 104 on the disk 38.

The disk drive 24 is an example data storage device, however the present invention is applicable to other data storage devices with rotatable storage media such CD players and DVD players.

The disk drive 24 can include an on-board stream manager and an embedded file system with FCP-AV/C for delay broadcast applications.

The data segment can be physically contiguous user data (bytes, sectors, tracks, etc.) recorded to and retrieved from the disk 38 each time the actuator assembly 42 moves the transducer head 64 in a skip-sequential manner. For instance, the data segment can be bytes of user data segmented into data sectors. The data segment is distinguished from a file allocation unit (FAU) used in file systems for computer applications. A FAU is typically 4096 to 8192 bytes (8 to 16 data sectors) while a data segment is typically 131 Kbytes (256 data sectors) to more than 1 Mbyte (several thousand data sectors or several tracks 74). Furthermore, a data segment can include a FAU.

The data segment size can be selected by balancing (1) preserving the forward sequential data transfer rate, (2) budgeting for error event management, (3) reducing the size and cost of the DRAM buffer 88, and (4) retaining the random access nature of the disk drive 24. The data segment need not be larger than one track 74, particularly as linear bit densities on the tracks 74 increase, or for applications that limit the data segment size to less than one track 74. Furthermore, the data segments can have the same or different sizes as long as they are radially coherent.

The data segment layouts illustrated in the drawings omit the servo wedges for convenience of explanation, however the present invention can be and preferably is implemented in rotatable storage media with embedded servo patterns.

The seek time can have one or more predetermined time values based on the rotational latency times of the intra-segment and inter-segment skews. The seek time can also be a maximum, minimum, or combination of the predetermined time values for all seek distances. Furthermore, the first seek time can be substantially equal to the rotational latency time for the intra-segment skew, the second seek time can be substantially equal to the rotational latency time for the inter-segment skew, and the third seek time can be substantially greater than the rotational latency time for the inter-segment skew.

The intra-segment and inter-segment skews are measured in a single rotational direction as the transducer head 64 passes circumferentially over the disk 38 due to the rotation of the disk 38. Furthermore, the intra-segment and inter-segment skews are referenced between the tracks 74 in a single radial direction. For instance, the intra-segment skew between tracks Tk0 and Tk1 is measured from the end rotational phase of track Tk0 in a single rotational direction (as the transducer head 64 passes circumferentially over the disk 38 from left to right) and is referenced between tracks Tk0 and Tk1 in a single radial direction (as the transducer head 64 moves radially across the disk 38 from track Tk0 to track Tk1 from top to bottom). Likewise, the inter-segment skew between tracks Tk1 and Tk2 is measured from the end rotational phase of track Tk1 in a single rotational direction (as the transducer head 64 passes circumferentially over the disk 38 from left to right) and is referenced between tracks Tk1 and Tk2 in a single radial direction (as the transducer head 64 moves radially across the disk 38 from track Tk1 to track Tk2 from top to bottom).

The microprocessor 80 can be a PD787012 microcontroller by NEC.

The present invention is applicable to other servo loops that perform seek operations based on predetermined seek times. See, for instance, U.S. Pat. No. 5,005,089 which is incorporated by reference.

The present invention has been described in considerable detail with reference to certain preferred versions thereof, however other versions are possible. Therefore, the spirit and scope of the appended claims should not be limited to the description of the preferred versions contained herein.

What is claimed is:

1. A method of storing data segments in a rotatable storage media in a data storage device, comprising:
   storing a first data segment in first tracks in the storage media, wherein the first tracks include a first start track and a first end track, the first data segment starts in the first start track at a start rotational phase, ends in the first end track at an end rotational phase, starts in adjacent first tracks at start rotational phases offset by an intra-segment rotational skew angle and ends in adjacent first tracks at end rotational phases offset by the intra-segment rotational skew angle; and
   storing a second data segment in second tracks in the storage media, wherein the second tracks include a second start track and a second end track, the second data segment starts in the second start track at the start rotational phase, ends in the second end track at the end rotational phase, starts in adjacent second tracks at start rotational phases offset by the intra-segment rotational skew angle and ends in adjacent second tracks at end rotational phases offset by the intra-segment rotational skew angle;
   wherein the first and second data segments are radially coherent, the first end track is adjacent to the second start track, and the start and end rotational phases are offset by an inter-segment rotational skew angle that is greater than the intra-segment rotational skew angle.

2. The method of claim 1, wherein the first data segment is physically contiguous user data, and the second data segment is physically contiguous user data.

3. The method of claim 1, wherein the first data segment fills the user data storage areas in the first tracks, and the second data segment fills the user data storage areas in the second tracks.

4. The method of claim 1, wherein the first and second data segments are isochronous audio-video data, and the storage device provides the same forward and reverse sequential access times for the first and second data segments.

5. The method of claim 1, wherein the first and second data segments have the same size.

6. The method of claim 1, wherein the first and second data segments have the same number of logical block addresses, and a logical block address at the end rotational phase in the first end track is adjacent to a logical block address at the start rotational phase in the second start track.

7. The method of claim 1, wherein the first tracks include another first track between the first start and end tracks, and the second tracks include another second track between the second start and end tracks.

8. The method of claim 1, wherein the first tracks consist of the first start and end tracks, and the second tracks consist of the second start and end tracks.

9. The method of claim 1, wherein the first tracks are adjacent to one another, and the second tracks are adjacent to one another.

10. The method of claim 1, wherein the first end track is the only first track adjacent to a second track, and the second start track is the only second track adjacent to a first track.

11. The method of claim 1, wherein the first and second tracks have the same number of tracks.

12. The method of claim 1, wherein the inter-segment rotational skew angle is at least twice the intra-segment rotational skew angle.

13. The method of claim 1, wherein the inter-segment rotational skew angle is 360−α(N−1) degrees where α is the intra-segment rotational skew angle, N is the number of first tracks and N is the number of second tracks.

14. The method of claim 1, wherein a rotational latency time for rotating the storage media across the intra-segment rotational skew angle is less than a rotational latency time for rotating the storage media across the inter-segment rotational skew angle.

15. The method of claim 1, wherein a rotational latency time for rotating the storage media across the intra-segment rotational skew angle is a seek time for moving the transducer head between adjacent first tracks and between adjacent second tracks.

16. The method of claim 1, wherein a rotational latency time for rotating the storage media across the inter-segment rotational skew angle is a seek time for moving a transducer head between the first end track and the second start track.

17. The method of claim 1, wherein the storage device is a disk drive.

18. The method of claim 1, wherein the storage device is a CD player.

19. The method of claim 1, wherein the storage device is a DVD player.

20. The method of claim 1, including:
storing a third data segment in third tracks in the storage media, wherein the third tracks include a third start track and a third end track, the third data segment starts in the third start track at the start rotational phase, ends in the third end track at the end rotational phase, starts in adjacent third tracks at start locations offset by the intra-segment rotational skew angle and ends in adjacent third tracks at end locations offset by the intra-segment rotational skew angle;
wherein the first, second and third data segments are radially coherent and the second end track is adjacent to the third start track.

21. A method of storing data segments in a rotatable storage media in a data storage device, comprising:
storing a first data segment in first tracks in the storage media, wherein the first tracks are adjacent to one another and include a first start track and a first end track, the first data segment starts in the first start track at a start rotational phase, ends in the first end track at an end rotational phase, starts in adjacent first tracks at start rotational phases offset by an intra-segment rotational skew angle and ends in adjacent first tracks at end rotational phases offset by the intra-segment rotational skew angle; and
storing a second data segment in second tracks in the storage media, wherein the second tracks are adjacent to one another and include a second start track and a second end track, the second data segment starts in the second start track at the start rotational phase, ends in the second end track at the end rotational phase, starts in adjacent second tracks at start rotational phases offset by the intra-segment rotational skew angle and ends in adjacent second tracks at end rotational phases offset by the intra-segment rotational skew angle;
wherein the first and second data segments are radially coherent and have the same size, the first tracks and the second tracks have the same number of tracks, the first end track is adjacent to the second start track, the start and end rotational phases are offset by an inter-segment rotational skew angle that is greater than the intra-segment rotational skew angle, and the inter-segment rotational skew angle is 360−α(N−1) degrees where a is the intra-segment rotational skew angle and N is the number of tracks.

22. The method of claim 21, wherein the first data segment is physically contiguous user data that fills the user data storage areas in the first tracks, and the second data segment is physically contiguous user data that fills the user data storage areas in the second tracks.

23. The method of claim 21, wherein the first and second data segments are isochronous audio-video data, and the storage device provides the same forward and reverse sequential access times for the first and second data segments.

24. The method of claim 21, wherein the first and second data segments have the same number of logical block addresses, and a logical block address at the end rotational phase in the first end track is adjacent to a logical block address at the start rotational phase in the second start track.

25. The method of claim 21, wherein the first tracks include another first track between the first start and end tracks, and the second tracks include another second track between the second start and end tracks.

26. The method of claim 21, wherein the first tracks consist of the first start and end tracks, and the second tracks consist of the second start and end tracks.

27. The method of claim 21, wherein a rotational latency time for rotating the storage media across the intra-segment rotational skew angle is a seek time for moving a transducer head between adjacent first tracks and between adjacent second tracks.

28. The method of claim 21, wherein a rotational latency time for rotating the storage media across the inter-segment rotational skew angle a seek time for moving the transducer head between the first end track and the second start track.

29. The method of claim 21, wherein the storage device is a disk drive.

30. The method of claim 21, including:
storing a third data segment in third tracks in the storage media, wherein the third tracks are adjacent to one another and include a third start track and a third end track, the third data segment starts in the third start track at the start rotational phase, ends in the third end track at the end rotational phase, starts in adjacent third tracks at start locations offset by the intra-segment rotational skew angle and ends in adjacent third tracks at end locations offset by the intra-segment rotational skew angle;

wherein the first, second and third data segments are radially coherent and have the same size, the first tracks, the second tracks and the third tracks have the same number of tracks, and the second end track is adjacent to the third start track.

31. The method of claim 21, wherein the first data segment is isochronous audio-video data from a first data stream, the second data segment is isochronous audio-video data from a second data stream, and the storage device provides the same forward and reverse sequential access times for the first and second data segments.

32. The method of claim 21, wherein the first data segment is isochronous audio-video data from a first data stream, the second data segment is isochronous audio-video data from a second data stream, and the storage device provides the same forward and reverse sequential access times for the first and second data segments.

33. In a disk drive that includes a disk and a transducer head that reads from and writes to the disk, wherein the disk includes first tracks and second tracks, the first tracks are adjacent to one another and include a first start track and a first end track, the second tracks are adjacent to one another and include a second start track and a second end track, the first end track is adjacent to the second start track, the transducer head passes over the first start track, the first end track, the second start track and the second end track in sequence as the transducer head moves radially across the disk in a radial direction, the transducer head passes circumferentially over the disk in a rotational direction as the disk rotates, and a rotational skew angle occurs in the rotational direction relative to traversing tracks in the radial direction, a method of storing data segments that contain user data in the disk, comprising:

storing a first data segment in the first tracks, wherein the first data segment starts in the first start track at a start rotational phase, ends in the first end track at an end rotational phase, and in each adjacent pair of the first tracks, starts at start rotational phases that are offset by an intra-segment rotational skew angle and ends at end rotational phases that are offset by the intra-segment rotational skew angle; and storing a second data segment in the second tracks, wherein the second data segment starts in the second start track at the start rotational phase, ends in the second end track at the end rotational phase, and in each adjacent pair of the second tracks, starts at start rotational phases that are offset by the intra-segment rotational skew angle and ends at end rotational phases that are offset by the intra-segment rotational skew angle;

wherein the first and second data segments are radially coherent and have the same size, and the start and end rotational phases are offset by an inter-segment rotational skew angle that is greater than the intra-segment rotational skew angle.

34. The method of claim 33, wherein the first data segment is physically contiguous user data that fills the user data storage areas in the first tracks, and the second data segment is physically contiguous user data that fills the user data storage areas in the second tracks.

35. The method of claim 33, wherein the first and second data segments have the same number of logical block addresses, and a logical block address at the end rotational phase in the first end track is adjacent to a logical block address at the start rotational phase in the second start track.

36. The method of claim 33, wherein the first tracks include another first track between the first start and end tracks, and the second tracks include another second track between the second start and end tracks.

37. The method of claim 33, wherein the first tracks consist of the first start and end tracks, and the second tracks consist of the second start and end tracks.

38. The method of claim 33, wherein the inter-segment rotational skew angle is 360−α(N−1) degrees where a is the intra-segment rotational skew angle, N is the number of first tracks and N is the number of second tracks.

39. The method of claim 38, wherein the intra-segment rotational skew angle spans 20 to 30 percent of the 360 degrees.

40. The method of claim 33, wherein a rotational latency time for rotating the disk across the intra-segment rotational skew angle is a first seek time for moving the transducer head between adjacent first tracks and between adjacent second tracks, a rotational latency time for rotating the disk across the inter-segment rotational skew angle is a second seek time for moving the transducer head between the first end track and the second start track, and the first seek time is less than the second seek time.

41. The method of claim 33, including:

providing the disk with third tracks that are adjacent to one another and include a third start track and a third end track, wherein the second and third tracks have the same number of tracks, the second end track is adjacent to the third start track, and the transducer head passes over the second start track, the second end track, the third start track and the third end track in sequence as the transducer head moves radially across the disk in the radial direction; and storing a third data segment in the third tracks, wherein the third data segment starts in the third start track at the start rotational phase, ends in the third end track at the end rotational phase, and in each adjacent pair of the third tracks, starts at start rotational phases that are offset by the intra-segment rotational skew angle and ends at end rotational phases that are offset by the intra-segment rotational skew angle;

wherein the first, second and third data segments are radially coherent and have the same size.

42. In a disk drive that includes a disk and a transducer head that reads from and writes to the disk, wherein the disk includes first tracks and second tracks in a recording zone, the first tracks are adjacent to one another and include a first start track and a first end track, the second tracks are adjacent to one another and include a second start track and a second end track, the first end track is adjacent to the second start track, the transducer head passes over the first start track, the first end track, the second start track and the second end track in sequence as the transducer head moves radially across the disk in a radial direction, the transducer head passes circumferentially over the disk in a rotational direction as the disk rotates, and a rotational skew angle occurs in the rotational direction relative to traversing tracks in the radial direction, a method of storing data segments that contain user data in the disk, comprising:

storing a first data segment in the first tracks, wherein the first data segment starts in the first start track at a start rotational phase, ends in the first end track at an end rotational phase, and in each adjacent pair of the first tracks, starts at start rotational phases that are offset by an intra-segment rotational skew angle and ends at end rotational phases that are offset by the intra-segment rotational skew angle; and storing a second data segment in the second tracks, wherein the second data segment starts in the second start track at the start rotational phase, ends in the second end track at the end rotational phase, and in each adjacent pair of the second tracks, starts at start rotational phases that are offset by the intra-segment rotational skew angle and ends at end rotational phases that are offset by the intra-segment rotational skew angle;

wherein the first and second data segments are radially coherent and have the same size, the start and end rotational phases are offset by an inter-segment rotational skew angle that is greater than the intra-segment rotational skew angle, and the inter-segment rotational skew angle is 360−α(N−1) degrees where α is the intra-segment rotational skew angle, N is the number of first tracks and N is the number of second tracks.

43. The method of claim 42, wherein the first data segment is physically contiguous user data that fills the user data storage areas in the first tracks, and the second data segment is physically contiguous user data that fills the user data storage areas in the second tracks.

44. The method of claim 42, wherein the first and second data segments have the same number of logical block addresses, and a logical block address at the end rotational phase in the first end track is adjacent to a logical block address at the start rotational phase in the second start track.

45. The method of claim 42, wherein the first tracks include another first track between the first start and end tracks, and the second tracks include another second track between the second start and end tracks.

46. The method of claim 42, wherein the first tracks consist of the first start and end tracks, and the second tracks consist of the second start and end tracks.

47. The method of claim 42, wherein the inter-segment rotational skew angle is at least twice the inter-segment rotational skew angle.

48. The method of claim 42, wherein the intra-segment rotational skew angle spans 20 to 30 percent of the 360 degrees.

49. The method of claim 42, wherein a rotational latency time for rotating the disk across the intra-segment rotational skew angle is a first seek time for moving the transducer head between adjacent first tracks and between adjacent second tracks, a rotational latency time for rotating the disk across the inter-segment rotational skew angle is a second seek time for moving the transducer head between the first end track and the second start track, and the first seek time is less than the second seek time.

50. The method of claim 42, including:
providing the disk with third tracks that are adjacent to one another and include a third start track and a third end track, wherein the second and third tracks have the same number of tracks, the second end track is adjacent to the third start track, and the transducer head passes over the second start track, the second end track, the third start track and the third end track in sequence as the transducer head moves radially across the disk in the radial direction; and storing a third data segment in the third tracks, wherein the third data segment starts in the third start track at the start rotational phase, ends in the third end track at the end rotational phase, and in each adjacent pair of the third tracks, starts at start rotational phases that are offset by the intra-segment rotational skew angle and ends at end rotational phases that are offset by the intra-segment rotational skew angle;

wherein the first, second and third data segments are radially coherent and have the same size.

51. A method of storing data segments in a rotatable storage media in a data storage device, comprising:

storing a first data segment that contains user data in first tracks in the storage media, wherein the first tracks are adjacent to one another and include a first start track and a first end track, the first data segment starts in the first start track at a start rotational phase, ends in the first end track at an end rotational phase, starts in adjacent first tracks at start rotational phases offset by an intra-segment rotational skew angle and ends in adjacent first tracks at end rotational phases offset by the intra-segment rotational skew angle; and storing a second data segment that contains user data in second tracks in the storage media, wherein the second tracks are adjacent to one another and include a second start track and a second end track, the second data segment starts in the second start track at the start rotational phase, ends in the second end track at the end rotational phase, starts in adjacent second tracks at start rotational phases offset by the intra-segment rotational skew angle and ends in adjacent second tracks at end rotational phases offset by the intra-segment rotational skew angle;

wherein the first and second data segments are radially coherent and have the same size, the first and second tracks have the same number of tracks, the first end track is adjacent to the second start track, and the start and end rotational phases are offset by an inter-segment rotational skew angle that is greater than the intra-segment rotational skew angle and is 360−α(N−1) degrees where a is the intra-segment rotational skew angle and N is the number of tracks.

52. The method of claim 51, wherein the first and second data segments have the same number of logical block addresses, and a logical block address at the end rotational phase in the first end track is adjacent to a logical block address at the start rotational phase in the second start track.

53. The method of claim 51, wherein the intra-segment rotational skew angle spans 20 to 30 percent of the 360 degrees.

54. The method of claim 51, wherein a rotational latency time for rotating the storage media across the intra-segment rotational skew angle is a first seek time for moving a transducer head between adjacent first tracks and between adjacent second tracks, a rotational latency time for rotating the storage media across the inter-segment rotational skew angle is a second seek time for moving the transducer head between the first end track and the second start track, and the first seek time is less than the second seek time.

55. The method of claim 51, wherein the storage device is a disk drive.

56. A method of storing data segments in a rotatable storage media in a data storage device, comprising:

providing a first data segment with physically contiguous user data and a second data segment with physically contiguous user data;

storing the first data segment in first tracks in the storage media, wherein the first tracks are adjacent to one another and include a first start track and a first end track, the first data segment starts in the first start track at a start rotational phase, ends in the first end track at an end rotational phase, starts in adjacent first tracks at start rotational phases offset by an intra-segment rotational skew angle and ends in adjacent first tracks at end rotational phases offset by the intra-segment rotational skew angle; and storing the second data segment in second tracks in the storage media, wherein the second tracks are adjacent to one another and include a second start track and a second end track, the second data segment starts in the second start track at the start rotational phase, ends in the second end track at the end rotational phase, starts in adjacent second tracks at start rotational phases offset by the intra-segment rotational skew angle and ends in adjacent second tracks at end rotational phases offset by the intra-segment rotational skew angle;

wherein the first and second data segments are radially coherent and have the same size, the first and second tracks have the same number of tracks, the first end track is adjacent to the second start track, and the start and end rotational phases are offset by an inter-segment rotational skew angle that is greater than the intra-segment rotational skew angle and is 360−α(N−1) degrees where a is the intra-segment rotational skew angle and N is the number of tracks.

57. The method of claim 56, wherein the first and second data segments have the same number of logical block addresses, and a logical block address at the end rotational phase in the first end track is adjacent to a logical block address at the start rotational phase in the second start track.

58. The method of claim 56, wherein the intra-segment rotational skew angle spans 20 to 30 percent of the 360 degrees.

59. The method of claim 56, wherein a rotational latency time for rotating the storage media across the intra-segment rotational skew angle is a first seek time for moving a transducer head between adjacent first tracks and between adjacent second tracks, a rotational latency time for rotating the storage media across the inter-segment rotational skew angle is a second seek time for moving the transducer head between the first end track and the second start track, and the first seek time is less than the second seek time.

60. The method of claim 56, wherein the storage device is a disk drive.

61. A method of storing data segments in a rotatable storage media in a data storage device, comprising:

providing a first data segment with isochronous audio-video data from a first data stream and a second data segment with isochronous audio-video data from a second data stream;

storing the first data segment in first tracks in the storage media, wherein the first tracks are adjacent to one another and include a first start track and a first end track, the first data segment starts in the first start track at a start rotational phase, ends in the first end track at an end rotational phase, starts in adjacent first tracks at start rotational phases offset by an intra-segment rotational skew angle and ends in adjacent first tracks at end rotational phases offset by the intra-segment rotational skew angle; and storing the second data segment in second tracks in the storage media, wherein the second tracks are adjacent to one another and include a second start track and a second end track, the second data segment starts in the second start track at the start rotational phase, ends in the second end track at the end rotational phase, starts in adjacent second tracks at start rotational phases offset by the intra-segment rotational skew angle and ends in adjacent second tracks at end rotational phases offset by the intra-segment rotational skew angle;

wherein the first and second data segments are radially coherent and have the same size, the first and second tracks have the same number of tracks, the first end track is adjacent to the second start track, and the start and end rotational phases are offset by an inter-segment rotational skew angle that is greater than the intra-segment rotational skew angle and is 360−α(N−1) degrees where a is the intra-segment rotational skew angle and N is the number of tracks.

62. The method of claim 61, wherein the first and second data segments have the same number of logical block addresses, and a logical block address at the end rotational phase in the first end track is adjacent to a logical block address at the start rotational phase in the second start track.

63. The method of claim 61, wherein the intra-segment rotational skew angle spans 20 to 30 percent of the 360 degrees.

64. The method of claim 61, wherein a rotational latency time for rotating the storage media across the intra-segment rotational skew angle is a first seek time for moving a transducer head between adjacent first tracks and between adjacent second tracks, a rotational latency time for rotating the storage media across the inter-segment rotational skew angle is a second seek time for moving the transducer head between the first end track and the second start track, and the first seek time is less than the second seek time.

65. The method of claim 61, wherein the storage device is a disk drive.

66. A method of storing data segments in a rotatable storage media in a data storage device, comprising:

providing a first data segment with isochronous audio-video data from a first data stream and a second data segment with isochronous audio-video data from a second data stream;

storing the first data segment in first tracks in the storage media, wherein the first tracks are adjacent to one another and include a first start track and a first end track, the first data segment starts in the first start track at a start rotational phase, ends in the first end track at an end rotational phase, starts in adjacent first tracks at start rotational phases offset by an intra-segment rotational skew angle and ends in adjacent first tracks at end rotational phases offset by the intra-segment rotational skew angle; and storing the second data segment in second tracks in the storage media, wherein the second tracks are adjacent to one another and include a second start track and a second end track, the second data segment starts in the second start track at the start rotational phase, ends in the second end track at the end rotational phase, starts in adjacent second tracks at start rotational phases offset by the intra-segment rotational skew angle and ends in adjacent second tracks at end rotational phases offset by the intra-segment rotational skew angle;

wherein the first and second data segments are radially coherent and have the same size, the first and second tracks have the same number of tracks, the first end track is adjacent to the second start track, the start and end rotational phases are offset by an inter-segment rotational skew angle that is greater than the intra-segment rotational skew angle and is 360−α(N−1) degrees where a is the intra-segment rotational skew angle and N is the number of tracks, and the storage device provides the same forward and reverse sequential access times for the first and second data segments.

67. The method of claim 66, wherein the first and second data segments have the same number of logical block addresses, and a logical block address at the end rotational phase in the first end track is adjacent to a logical block address at the start rotational phase in the second start track.

68. The method of claim 66, wherein the intra-segment rotational skew angle spans 20 to 30 percent of the 360 degrees.

69. The method of claim 66, wherein a rotational latency time for rotating the storage media across the intra-segment rotational skew angle is a first seek time for moving a transducer head between adjacent first tracks and between adjacent second tracks, a rotational latency time for rotating the storage media across the inter-segment rotational skew angle is a second seek time for moving the transducer head between the first end track and the second start track, and the first seek time is less than the second seek time.

70. The method of claim 66, wherein the storage device is a disk drive.

71. In a data storage system including a data storage media having a rotatable recording surface, a method for storing data segments to the recording surface in concentric data tracks, comprising:

recording a set of data segments onto the recording surface, wherein each recorded data segment includes a start, an end and a rotational phase from the data segment to each of the other data segments in the set, the data segments are recorded with coherent relative rotational phases, each data segment includes one or more tracks, the rotational phase from one data segment to the other data segments is selected as a function of the number of tracks in each data segment and any skew angle between the tracks, the skew angle defines a circumferential offset between the tracks in each data segment, and the rotational phase R from the end of a data segment to the start of any other data segment is $R=360-\alpha(N-1)$ degrees where $\alpha$ is the skew angle between tracks within a data segment and N is the number of tracks in a data segment.

72. In a data storage system including a data storage media having a rotatable recording surface, a method for storing data segments to the recording surface in concentric data tracks, comprising:

recording a set of data segments onto the recording surface, wherein each recorded data segment includes a start, an end and a rotational phase from the data segment to each of the other data segments in the set, the data segments are recorded with coherent relative rotational phases, each data segment includes one or more tracks, the rotational phase from one data segment to the other data segments is selected as a function of the size of the data segments, the number of tracks in each data segment and any skew angle between the tracks, the skew angle defines a circumferential offset between the tracks in each data segment, and the rotational phase R from the end of a data segment to the start of any other data segment is $R=360-\alpha(N-1)$ degrees where a is the skew angle between tracks within a data segment and N is the number of tracks in a data segment.

* * * * *